(12) United States Patent
Munz et al.

(10) Patent No.: US 12,439,349 B2
(45) Date of Patent: Oct. 7, 2025

(54) DEVICES AND METHODS FOR HANDLING PRECISE TIMING PROTOCOL FRAMES

(71) Applicant: Telefonaktiebolaget LM Ericsson (publ), Stockholm (SE)

(72) Inventors: Hubertus Munz, Aachen (DE); Kun Wang, Solna (SE); Stefano Ruffini, Rome (IT); Zhenhua Zou, Solna (SE); John Walter Diachina, Garner, NC (US); Torsten Dudda, Wassenberg (DE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 17/297,802

(22) PCT Filed: Oct. 15, 2019

(86) PCT No.: PCT/SE2019/051013
§ 371 (c)(1),
(2) Date: May 27, 2021

(87) PCT Pub. No.: WO2020/111994
PCT Pub. Date: Jun. 4, 2020

(65) Prior Publication Data
US 2022/0030530 A1   Jan. 27, 2022

Related U.S. Application Data

(60) Provisional application No. 62/771,609, filed on Nov. 27, 2018.

(51) Int. Cl.
*H04W 56/00* (2009.01)
*H04J 3/06* (2006.01)

(52) U.S. Cl.
CPC ......... *H04W 56/001* (2013.01); *H04J 3/0667* (2013.01)

(58) Field of Classification Search
USPC .......................................................... 370/350
See application file for complete search history.

(56) References Cited

U.S. PATENT DOCUMENTS

2018/0237039 A1* 8/2018 Mong .................... B61L 23/005
2018/0309655 A1* 10/2018 Joseph .................... H04L 43/50
(Continued)

FOREIGN PATENT DOCUMENTS

| CN | 106301996 A | 1/2017 |
|---|---|---|
| WO | 2014029533 A1 | 2/2014 |
| WO | 2020081062 A1 | 4/2020 |

OTHER PUBLICATIONS

MediaTek Inc., TSN Interworking in 5G System, 3GPP TSG-RAN WG2 Meeting #103-Bis R2-1813967 (Year: 2018).*
(Continued)

*Primary Examiner* — Luna Weissberger
(74) *Attorney, Agent, or Firm* — Murphy, Bilak & Homiller, PLLC

(57) ABSTRACT

A method performed by a transmitting device, in a 3GPP wireless communication 5 system (100), for handling generalized Precise Timing Protocol (gPTP) signaling, from a Time Sensitive Network (TSN) is provided. The transmitting device receives (1301) a gPTP frame from the TSN network. The gPTP frame comprises time information, an indication of a time domain related to the time information and/or a Medium Access Control (MAC) address of a second end station connected to a receiving device. Based 10 on the indication of the time domain and/or the MAC address, the transmitting device determines (1302) the receiving device which the gPTP frame relates to. The transmitting device transmits (1304), to the determined
(Continued)

receiving device, the gPTP frame in a PDU session related to the determined receiving device.

19 Claims, 22 Drawing Sheets

(56) References Cited

U.S. PATENT DOCUMENTS

| | | |
|---|---|---|
| 2019/0007151 A1 | 1/2019 | Goel et al. |
| 2019/0173596 A1 | 6/2019 | Chen et al. |
| 2020/0295861 A1 | 9/2020 | Zinner |
| 2021/0211215 A1 | 7/2021 | Zhu et al. |
| 2021/0345276 A1* | 11/2021 | Uchino ............ H04W 56/0015 |
| 2021/0400524 A1 | 12/2021 | Kahn et al. |

OTHER PUBLICATIONS

MediaTek Inc., TSN Interworking in 5G System, Chengdu, China, Oct. 8-12, 2018, 3GPP TSG-RAN WG2 Meeting #103-Bis R2-1813967 (Year: 2018).*

Siemens, High Available Synchronization with IEEE 802.1AS bt (Year: 2013).*

3GPP, "3GPP TS 24.301 V15.4.0", 3rd Generation Partnership Project; Technical Specification Group Core Network and Terminals; Non-Access-Stratum (NAS) protocol for Evolved Packet System (EPS); Stage 3 (Release 15), Sep. 2018, 1-530.

3GPP, "3GPP TR 23.734 V0.3.0", 3rd Generation Partnership Project; Technical Specification Group Services and System Aspects; Study on 5GS Enhanced support of Vertical and LAN Services (Release 16), Oct. 2018, 1-97.

3GPP, "3GPP TS 24.008 V15.4.0", 3rd Generation Partnership Project; Technical Specification Group Core Network and Terminals; Mobile radio interface Layer 3 specification; Core network protocols; Stage 3 (Release 15), Sep. 2018, 1-221.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Author Unknown, "Timing and Synchronization for Time-Sensitive Applications", IEEE P802.1AS-Rev/D7.3, Draft Standard for Local and Metropolitan Area Networks, LAN/MAN Standards Committee of the IEEE Computer Society, Aug. 2, 2018, 1-502.

Ericsson, "distributed time aware relay", 3GPP TSG-SA WG2 Meeting #129BIS, S2-1812418, (revision of 18xxxx), West Palm Beach, Florida, Nov. 26-30, 2018, 1-5.

Ericsson, "Overview of UE Time Synchronization Methods", 3GPP TSG-RAN WG2 #104, Tdoc R2-1817172, Spokane, US, Nov. 12-16, 2018, 1-6.

Ericsson, et al., "proposal of merge (Solution11 option3 and solution 28)", 3GPP TSG-SA WG2 Meeting #132, S2-1903372, (revision of 19xxxx), Xi'an, China, Apr. 5-12, 2019, 1-9.

Goetz, Franz-Josef, "High Available Synchronization with IEEE 802.1AS bt", IEEE 802 Meeting—TSN-TG, Orlando, USA, Mar. 19, 2013, 1-21.

Huawei, et al., "Solution of Time Synchronization in Multiple TSN Clock Domains", SA WG2 Meeting #129bis, S2-1812413, (revision of S2-18xxxx), West Palm Beach, Florida, US, Nov. 26-30, 2018, 1-11.

IEEE, "Bridges and Bridged Networks", IEEE P802.1Qcc/D2.3, May 3, 2018, 1-214.

Nokia, et al., "Terminology correction for type-a/type-b to non-public network", SA WG2 Meeting #129, S2-1810432 (revision of S2-18xxxx), Dongguan, China, Oct. 15-19, 2018, 1-33.

Nokia, et al., "TSN Time Synchronization", SA WG2 Meeting #129, S2-18111437, (revision of S2-18xxxx), Dongguan, China, Oct. 15-19, 2018, 1-7.

Unknown, Author, "Introduction of providing sufficiently granular time reference information", 3GPP TSG-RAN WG2 #102 R2-1809053, Busan, Korea, May 21-25, 2018, pp. 1-47.

Unknown, Author, "Use Cases IEC/IEEE 60802", V0.61, Apr. 30, 2018, pp. 1-60.

* cited by examiner

PTP Message Header Format

| Bits | | | | | | | | | Octets | Offset |
|---|---|---|---|---|---|---|---|---|---|---|
| 7 | 6 | 5 | 4 | 3 | 2 | 1 | 0 | | | |
| transportSpecific | | | | messageType | | | | 1 | 0 |
| Reserved | | | | versionPTP | | | | 1 | 1 |
| messageLength | | | | | | | | 2 | 2 |
| domainNumber | | | | | | | | 1 | 4 |
| Reserved | | | | | | | | 1 | 5 |
| Flags | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceID | | | | | | | | 2 | 30 |
| controlField | | | | | | | | 1 | 32 |
| logMessageInterval | | | | | | | | 1 | 33 |

Fig. 7

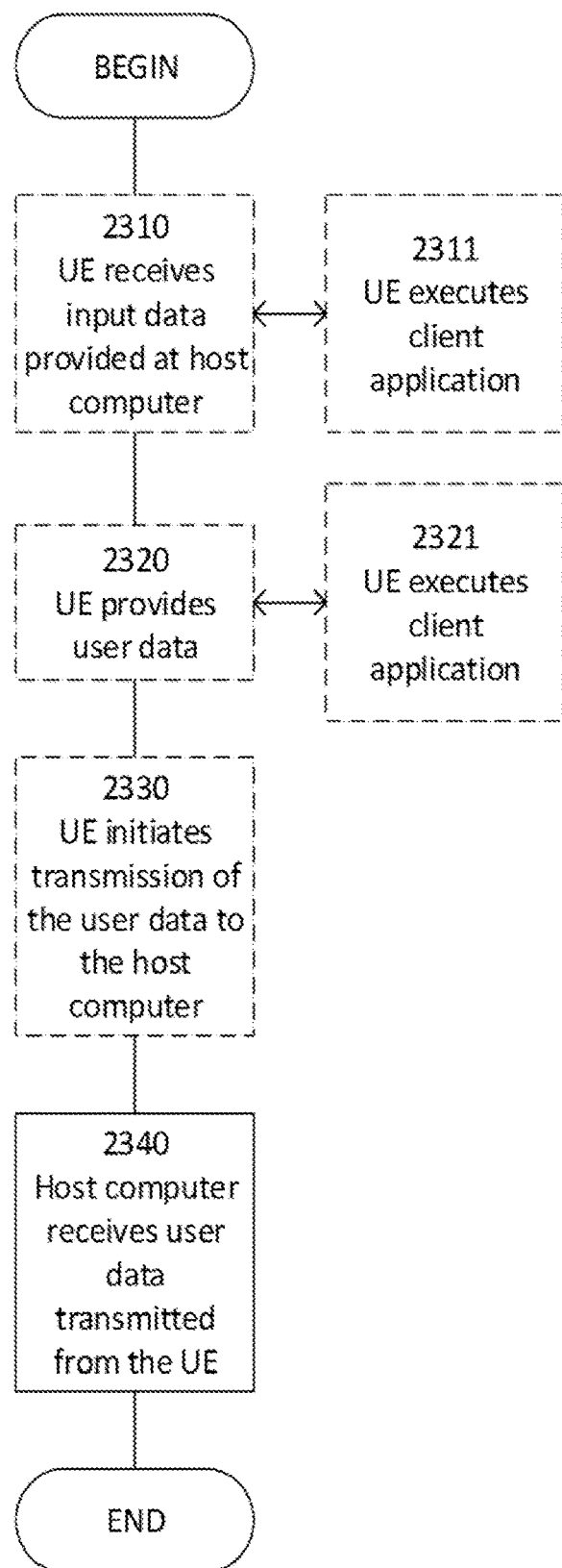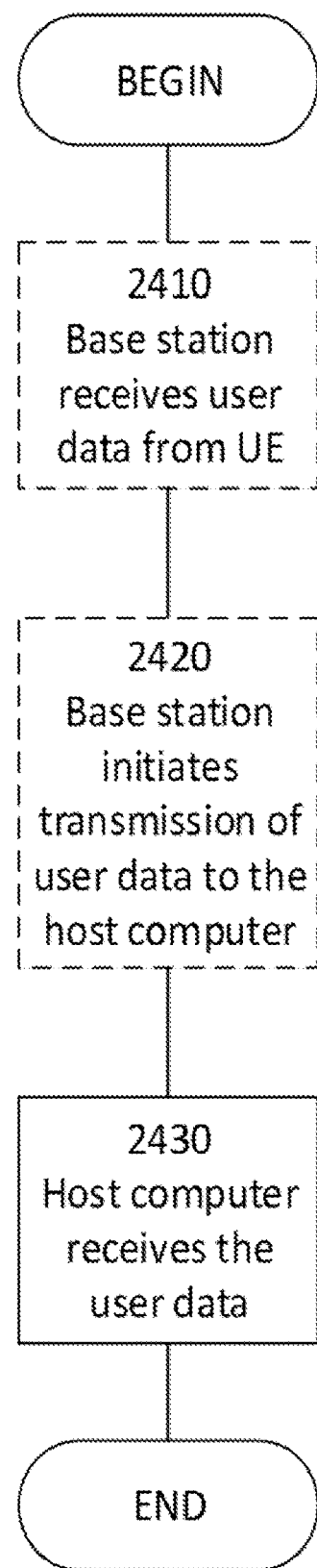
Fig. 23
Fig. 24

DEVICES AND METHODS FOR HANDLING PRECISE TIMING PROTOCOL FRAMES

TECHNICAL FIELD

Embodiments herein relate to devices and methods for handling Precise Timing Protocol (PTP) frames from a Time Sensitive Network (TSN) in a communications network. In particular, the embodiments herein refer to a transmitting device and a receiving device and methods therein for handling generalized PTP frames in a 3GPP communications network, such as e.g. a Fifth Generation (5G) network.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Time Sensitive Networking

Time Sensitive Networking is based on the IEEE 802.3 Ethernet standard. The TSN provides deterministic services through IEEE 802.3 networks, such as e.g. time synchronization, guaranteed low latency transmissions and high reliability to make legacy Ethernet, designed for best-effort communication, deterministic. The TSN features available today may be grouped into the following categories:

Time Synchronization (e.g. IEEE 802.1AS)
Bounded Low Latency (e.g. IEEE 802.1Qav, IEEE 802.1Qbu, IEEE 802.1Qbv, IEEE 802.1Qch, IEEE 802.1Qcr)
Ultra-Reliability (e.g. IEEE 802.1CB, IEEE 802.1Qca, IEEE 802.1Qci)
Network Configuration and Management (e.g. IEEE 802.1Qat, IEEE 802.1Qcc, IEEE 802.1Qcp, IEEE 802.1CS)

The configuration and management of the TSN network may be implemented in different manners, either in a centralized or in a distributed setup as defined in IEEE 802.1Qcc. The different configuration models are shown in FIGS. 1, 2 and 3. FIG. 1 shows a distributed TSN configuration model, FIG. 2 shows a centralized TSN configuration model, and FIG. 3 shows a fully centralized TSN Configuration Model, as defined in IEEE P802.1Qcc/D2.3.

The communication endpoints inside the TSN are referred to as Talker and Listener. A TSN network comprises multiple entities and features. All switches, which are referred to as bridges in the FIGS. 1 to 3, in between the Talker and the Listener need to support certain TSN features, like e.g. IEEE 802.1AS time synchronization. A TSN domain enables synchronized communication among nodes. The communication between Talker and Listener is performed in streams. A stream is based on certain requirements in terms of data rate and latency given by an application implemented at the Talker and/or the Listener. The TSN configuration and management features are used to setup the stream and guarantee the stream's requirements across the network. In the distributed model shown in FIG. 1, the Talker and Listener may for example use a Stream Reservation Protocol (SRP) to setup and configure a TSN stream in every switch along the path from Talker to Listener in the TSN network. Nevertheless, some TSN features require a central management entity referred to as Centralized Network Configuration (CNC) tool as shown in FIG. 2. The CNC may for example use Netconf and YANG models to configure the switches in the network for each TSN stream. This also allows the use of time-gated queueing as defined in IEEE 802.1Qbv that enables data transport in a TSN network with deterministic latency. With time-gated queueing on each switch, queues are opened or closed following a precise schedule that allows high priority packets to pass through the switch with minimum latency and jitter if it arrives at ingress port within the time the gate is scheduled to be open. In the fully centralized model, as shown in FIG. 3, a Centralized User Configuration (CUC) entity is further added that is used as a point of contact for Listener and Talker. The CUC collects stream requirements and endpoint capabilities from the devices and communicates with the CNC directly. The details about TSN configuration is explained in further detail in IEEE 802.1Qcc.

TSN Stream Setup in the Centralized Configuration Model

FIG. 4 shows a sequence chart of the procedure of TSN stream configuration using the fully centralized configuration model as shown in FIG. 3. The steps performed to setup a TSN stream in the TSN network in fully centralized configuration mode are the following:

1. The CUC may receive input from e.g. an industrial application/engineering tool, such as e.g. a Programmable Logic Controller (PLC), which specifies the devices which are supposed to exchange time-sensitive streams.

2. The CUC reads the capabilities of end stations and applications in the TSN network that includes information about period/interval of user traffic and payload sizes.

3. Based on this above information the CUC selects Talker and Listener for each stream and creates other stream related info, such as:

A StreamID as an identifier for each TSN stream,

A StreamRank, and

UsertoNetwork Requirements.

4. The CNC discovers a physical network topology using for example a Link Layer Discovery Protocol (LLDP) and any network management protocol such as e.g. Remote Management Protocol (RMP).

5. The CNC reads TSN capabilities of the bridges (e.g. IEEE 802.1Q, 802.1AS, 802.1CB) in the TSN network, e.g. by means of a network management protocol.

6. The CUC initiates join requests to configure the streams in order to configure network resources at the bridges for a TSN stream from one Talker to one Listener.

7. Talker and Listener groups (a group of elements specifying a TSN stream) are created by CUC, as specified in IEEE 802.1Qcc, 46.2.2.

8. The CNC configures the TSN network such as the TSN domain.

9. The CNC checks the physical topology and checks if the time sensitive streams are supported by the bridges in the network.

10. The CNC performs scheduling and path computation of the streams.

11. The CNC configures TSN features in the bridges along the path in the TSN network.

12. The CNC returns a status (success or failure) of resulting resource assignment for streams to the CUC.

13. The CUC further configures end stations to start the user plane traffic exchange as defined initially between the Listener and the Talker.

In a TSN network, a stream identity (streamID) may be used to uniquely identify stream configurations. It is used to assign TSN resources to a user's stream. The streamID comprises two tuples, namely:

1. A Medium Access Control (MAC) Address associated with the TSN Talker

2. A UniqueID to distinguish between multiple streams within end stations identified by MacAddress In the distributed configuration model as illustrated in FIG. 1, there is no CUC and no CNC. The Talker is therefore responsible for initiation of a TSN stream. As no CNC is present, the bridges are configuring themselves which does not allow the use of for example time-gated queuing as defined in 802.1Qbv.

In the centralized model as depicted in FIG. 2 the Talker is responsible for stream initialization but the bridges are configured by CNC.

5G and TSN Interworking Basics

To connect devices wirelessly to a TSN network, 5G is a promising solution. The 5G standard addresses factory use cases through a lot of new features, especially on the RAN to make it more reliable and reduce the transmit latency compared to 4G. The 5G network comprises three main components, which are the UE, the RAN instantiated as the gNB and nodes, such as a User Plane Function (UPF) within the 5G core network (5GCN). The 5G network architecture is illustrated in FIG. 5. A control plane of the 5G network further comprises a Network Repository Function (NRF), an Access Management Function (AM F), a Session Management Function (SMF), a Network Exposure Function (NEF), a Policy Control Function (PCF) and a Unified Data Management (UDF).

An ongoing research challenge is the inter-working of 5G and TSN as illustrated in FIG. 6. Both technologies define their own methods for network management and configuration and different mechanisms to achieve communication determinism that must somehow be arranged to enable end-to-end deterministic networking for industrial networks. In the following the device connected to the 5G network is referred to as 5G endpoint. A device connected to the TSN domain is referred to as a TSN endpoint.

Despite what is shown in FIG. 6 it is also possible that the UE is not connected to a single endpoint but instead to a TSN network comprising of at least one TSN bridge and at least one endpoint. The UE is in such a situation part of a TSN-5G gateway, in which end stations communicate with UEs within the context of a local TSN network that is isolated from the primary TSN network by the 5G network.

In the following, an example of how Ethernet transport in a 5G system (5GS) according to the scenario shown in FIG. 6 may work shall be described.

Ethernet Protocol Data Units (PDUs) Relayed Over 5G Network

This scenario assumes cases where a single UE needs to support one or multiple endpoints, each having a distinct Ethernet MAC layer address. In other words, the UE may support multiple Ethernet ports.

The User Plane Function (UPF) that interfaces with the TSN switch is assumed to support the reception and transmission of Ethernet PDUs.

Upon receiving an Ethernet PDU from the TSN switch, the UPF must be able to associate the destination MAC address or addresses to, for example, a PDU session, e.g. based on the IP address of the UE associated with the destination MAC address, and then relay the Ethernet PDU to the appropriate node in the 5G network.

The gNB sends the Ethernet PDU to the UE using a data radio bearer (DRB) with reliability and latency attributes appropriate for supporting the Ethernet PDU transmission.

The UE recovers the Ethernet PDU, e.g. from the PDCP layer, and sends the Ethernet PDU to the endpoint associated with the destination MAC address, since the UE may support one or more Ethernet connected endpoints.

In summary, the original Ethernet PDU received by the UPF from the TSN switch is delivered transparently through the 5G network.

For the uplink direction the 5G network is expected to determine when a Radio Network Temporary Identifier (RNTI) is associated with the Ethernet operation, thereby allowing uplink payload, such as e.g. an Ethernet PDU, associated with the RNTI to be routed to a UPF. The UPF then simply sends the received Ethernet PDU to a TSN switch.

Time Synchronization in TSN Networks

Many TSN features are based on precise time synchronization between all peers. Also, a lot of industrial applications rely on a precise synchronization. As introduced above this is achieved using e.g. IEEE 802.1AS or IEEE P802.1AS-rev. Within the TSN network it is therefore possible to achieve a synchronization with sub-microsecond error. In order to achieve this level of accuracy a hardware support might be required; e.g. for timestamping of packets.

In the network, a grandmaster (GM) is a node that transmits timing information to all other nodes in a master-slave architecture. The GM may be elected out of several potential nodes, by certain criteria that make the selected grandmaster superior.

In a TSN-extension of 802.1AS (i.e. P802.1AS-rev), it has been defined that next to a main GM also a second redundant backup GM may be configured. In case the main GM fails for any reason, devices in the TSN domain may be synched to the second redundant GM. The redundant GM might work in a hot-standby configuration.

In TSN based on IEEE P802.1AS-rev, which is also referred to as a generalized Precise Timing Protocol (gPTP) there may be multiple time domains and associated gPTP domains supported in a TSN network. The gPTP supports two timescales:

Timescale PTP: The epoch is the PTP epoch (details in IEEE 802.1 AS-rev section 8.2.2) and this timescale is continuous. The unit of measure of the time is the SI second as realized on the rotating period.

Timescale ARB (arbitrary): The epoch for this timescale is domain startup time and can be setup by administrative procedure (more details in IEEE 802.1AS-rev, section 3.2).

Devices in the TSN network may be synched to multiple time domains. A local arbitrary time domain may also be referred to as a working clock.

One of the initial steps for setting up the TSN stream, as explained above, and shown in FIG. 4, is the establishment of a TSN domain by the CNC, by grouping endpoints, such as talkers and listeners, that are supposed to exchange time-sensitive streams. This list is provided by the CUC to the CNC. The CNC further configures the bridges connecting these endpoints such that each TSN domain, such as talkers, listeners and bridges, has its own working clock. Technically this may be done according to IEEE P802.1AS-rev, by configuring an external port role configuration mechanism.

FIG. 7 shows a PTP header used for every PTP packet (note, interpretation of some fields is being revised in the new edition of the IEEE1588 and correspondingly in the IEEE P802.1ASRev). The domain number (domainNumber) defines for each frame, which time domain the frame belongs to. PTP time domains allow using multiple independent PTP clocks on a single network infrastructure. These numbers need to be configured at each end-station so that each end-station is aware about which time domain it requires.

The PTP header in FIG. 7 comprises the following fields:
a transport speciffic (transportSpeciffic) field,
a message type (messageType) field,
three Reserved fields,
a version PTP (versionPTP) field,
a message length (messageLength) field,
a domain number (domainNumber) field,
a Flags field,
a correction field (correctionField),
a source port identity (sourcePortIdentity) field,
a sequence identity (sequenceID) field,
a control field (controlField), and
a log message interval (logMessageInterval) field, As per IEEE P802.1AS-Rev/D7.3, it is specified that the destination address of announce and signaling messages shall be reserved a multicast address 01-80-C2-00-00-0E. Furthermore, also the destination MAC address of SYNC, Follow-Up, Pdelay_Request, Pdelay_Response and Pdelay_Response_Follow_Up which are all used for peer-to-peer synchronization shall be reserved the multicast address 01-80-C2-00-00-0E. It shall be noted that as per IEEE802.1Q, frames with this address may never be forwarded, non-forwardable address, but must be terminated by the bridge. As Source address they shall use the MAC address of any egress physical port.

Multiple Time Domains in Industrial Application Scenario

As introduced above, the TSN domain works with different clocks, such as e.g. global and working clocks. Furthermore, the clocks of each TSN domain are not necessarily synchronized and a factory network may comprise of several TSN domains. Therefore, across a factory network there might be several independent TSN domains with arbitrary timescales where different may be overlapping subsets of devices need to be synchronized. As shown in FIG. 8, each TSN domain may have its own working clock. FIG. 8 depicts four TNS domains. Each TSN domain represented by a line/cell also referred to as a working group, has its own working clock. A line/cell when used herein means a group of devices, e.g. robots, in the factory plant, often comprises a single machine or a set of neighbouring machines that physically collaborate, which means all devices within the group need to be synchronized and coordinated.

The four respective TNS domains 1, 2, 3 and 4 shown in FIG. 8, has its own working clock, working clock domain 1, working clock domain 2, working clock domain 3, working clock domain 4.

3GPP Perspective to Provide Time Reference to UE

To satisfy time synchronization requirements for TSN in manufacturing use cases, a cellular network is required to provide a time reference to which all machines, such as e.g. sensors or actuators, can be synchronized. Currently in 3GPP standardization release 15 for LTE radio, a mechanism has been developed that allows time synchronization between Base Stations (BSs) and UEs with a sub-microseconds accuracy. It has been proposed in 3GPP RAN 2, to add two Information Elements (IE) into System Information Block (SIB)16, such as e.g. a time reference with a certain granularity, such as e.g. 0.25ps, and uncertainty value, and the DL Radio Resource Control (RRC) message UETimeReference to transmit a GPS time to the UE with three IEs added in an RRC message. The main purpose of this procedure is to transfer GPS based time reference information to UEs along with inaccuracy of that information.

System Information Blocks (SIBs)

LTE defines several SIBs, related to timing information in SIB 16 or any other suitable SIBx, which contains information related to GPS time and Coordinated Universal Time (UTC). The SIBs are transmitted over a Downlink Shared Channel (DL-SCH). The presence of a SIB in a subframe is indicated by the transmission of a corresponding Physical Downlink Control Channel (PDCCH) marked with a special System-Information RNTI (SI-RNTI). The Information Element (IE) SIB 16 contains information related to GPS time and UTC. The UE may use the parameter blocks to obtain the GPS and the local time.

The structure of the SIB 16 message is shown below:

SystemInformationBlockType16 information element

```
-- ASN1START
SystemInformationBlockType16-r11 ::=                    SEQUENCE {
timeInfo-r11                    SEQUENCE {
                    timeInfoUTC-r11         INTEGER (0..549755813887),
                    dayLightSavingTime-r11  BIT STRING (SIZE (2))        OPTIONAL,
                    -- Need OR
```

| SystemInformationBlockType16 information element | | | |
|---|---|---|---|
| | leapSeconds-r11<br>-- Need OR | INTEGER (−127..128) | OPTIONAL, |
| | localTimeOffset-r11<br>-- Need OR | INTEGER (−63..64) | OPTIONAL |
| }<br>-- Need OR | | | OPTIONAL, |
| lateNonCriticalExtension | OCTET STRING | | OPTIONAL, |
| ...,<br>[[ | granularityOneQuarterUs-r15<br>OPTIONAL, -- Need OR | | INTEGER (0..36028797018963967) |
| | uncert-quarter-us-r15 | INTEGER (0..3999) | OPTIONAL |
| ]]<br>} | | | |

A proposed SIP Type 16 is shown in below Table 1:

| SystemInformationBlockType16 field descriptions |
|---|
| dayLightSavingTime<br>Indicates if and how daylight saving time (DST) is applied to obtain the local time. The semantics is the same as the semantics of the Daylight Saving Time IE in TS 24.301 [35] and TS 24.008 [49], The first/leftmost bit of the bit string contains the b2 of octet 3, i.e. the value part of the Daylight Saving Time IE, and the second bit of the bit string contains b1 of octet 3.<br>leapSeconds<br>Number of leap seconds offset between GPS Time and UTC. UTC and GPS time are related i.e. GPS time − leapSeconds = UTC time.<br>localTimeOffset<br>Offset between UTC and local time in units of 15 minutes. Actual value = field value * 15 minutes. Local time of the day is calculated as UTC time + localTimeOffset.<br>granularityOneQuarterUs<br>Coordinated Universal Time corresponding to the SFN boundary at or immediately after the ending boundary of the SI-window in which SystemInformationBlockType16 is transmitted. This field counts the number of GPS time in 0.25 us units since 00:00:00 on Gregorian calendar date 6 Jan., 1980 (start of GPS time).<br>timeInfoUTC<br>Coordinated Universal Time corresponding to the SFN boundary at or immediately after the ending boundary of the SI-window in which SystemInformationBlockType16 is transmitted. The field counts the number of UTC seconds in 10 ms units since 00:00:00 on Gregorian calendar date 1 Jan. 1900 (midnight between Sunday, Dec. 31, 1899 and Monday, Jan. 1, 1900). NOTE 1.<br>This field is excluded when estimating changes in system information, i.e. changes of timeInfoUTC should neither result in system information change notifications nor in a modification of systemInfoValueTag in SIB1.<br>uncert-quarter-us<br>Indicates the uncertainty of the reference time, where a value of 'k' indicates an uncertainty of ±0.25 (k + 1) us, i.e., '0' indicates an uncertainty of ±0.25 us, a value of '1' indicates an uncertainty of ±0.5 us, and so on. The UE uses the value of this field to determine how to interpret the value of the granularityOneQuarterUs field. For example, if uncert-quarter-us = '3' then the uncertainty is 2 us and the UE will interpret the value of the granularityOneQuarterUs field to be within the range granularityOneQuarterUs + 2 us. |

Time Reference Information in RRC Signaling

Another way of providing time synchronization may be to use a time reference information message in RRC signaling to transmit the GPS time to the UE.

Time Synchronization in 5G to Support TSN

The release 16 work is ongoing and different options are discussed to address the needs for time synchronization as required by TSN and industrial applications. Especially the support of multiple time domains in 5G is an open topic.

SUMMARY

An object of embodiments herein is to improve the way of handling BWP a wireless communications network.

According to an aspect of embodiments herein, the object is achieved by a method performed by a transmitting device, in a 3GPP wireless communication system, for handling generalized Precise Timing Protocol, gPTP, signaling, from a Time Sensitive Network, TSN. The transmitting device receives a gPTP frame from the TSN network. The gPTP frame comprises time information, an indication of a time domain related to the time information and/or a Medium Access Control, MAC, address of a second end station connected to a receiving device. Based on the indication of the time domain and/or the MAC address, the transmitting device determines the receiving device which the gPTP frame relates to. The transmitting device transmits to the determined receiving device, the gPTP frame in a PDU session related to the determined receiving device.

According to another aspect of embodiments herein, the object is achieved by a method performed by a receiving device, in a 3GPP wireless communication system, for handling generalized Precise Timing Protocol, gPTP, signaling, from a Time Sensitive Network, TSN. The receiving device receives a PDU session from a transmitting device.

The PDU session comprises a gPTP frame which in turn comprises a time information an indication of a time domain related to the time information and/or a Medium Access Control, MAC, MAC, address of one or more second end stations connected to a receiving device. The receiving device determines, based on the indication of the time domain and/or the MAC address, one or more second end stations in the TSN network to transmit the received gPTP frame to. The receiving device transmits the gPTP frame to the one or more second end stations in the TSN network. The gPTP frame comprises the time information and the time domain related to the time information extracted from the 3GPP message.

According to another aspect of embodiments herein, the object is achieved by a transmitting device in a 3GPP wireless communication system, for handling generalized Precise Timing Protocol, gPTP, signaling, from a Time Sensitive Network, TSN. The transmitting device is configured to:

Receive, from the TSN network, a gPTP frame, such as e.g. an Announce message or a sync message, wherein the gPTP frame comprises time information, an indication of a time domain related to the time information and/or a Medium Access Control, MAC, address of a second end station connected to a receiving device, determine, based on the indication of the time domain and/or the MAC address, the receiving device which the gPTP frame relates to, and transmit, to the determined receiving device, the gPTP frame in a PDU session related to the determined receiving device.

According another an aspect of embodiments herein, the object is achieved by a receiving device in a wireless communication system, for handling generalized Precise Timing Protocol, gPTP, signaling, from a Time Sensitive Network, TSN. The receiving device is configured to:

Receive, from a transmitting device, a PDU session comprising gPTP frame which in turn comprises a time information an indication of a time domain related to the time information and/or a Medium Access Control, MAC, address of one or more second end stations connected to a receiving device, determine, based on the indication of the time domain and/or the MAC address, one or more second end stations in the TSN network to transmit the received gPTP frame to, and transmit, to the one or more second end stations in the TSN network, the gPTP frame, wherein the gPTP frame comprises the time information and the time domain related to the time information extracted from the 3GPP message.

BRIEF DESCRIPTION OF THE DRAWINGS

FIG. 7 is a table illustrating a PTP header format.

FIG. 23 is a flowchart depicting methods implemented in a communication system including a host computer, a base station and a user equipment in accordance with some embodiments;

FIG. 24 is a flowchart depicting methods implemented in a communication system including a host computer, a base station and a user equipment in accordance with some embodiments.

DETAILED DESCRIPTION

It is herein assumed that gPTP frames are transmitted transparently through the 5G network. This may involve a timestamping of packets at the ingress and afterwards at the egress to be able to correct the time carried in the gPTP frames.

The overall behavior may be described as gPTP frames being carried as Ethernet frames through the 5G network. In reality new gPTP frames must be regenerated at the egress points of the 5G system. In this case the 5GS does not participate in the IEEE802.1AS Best Mast Clock Algorithm (BMCA)s. An accurate transport of time information in gPTP frames may involve any kind of timestamping of gPTP frames at any point in the 5GS based on a common 5G time shared by all nodes in the 5GS.

gPTP messages are sent to synchronize slaves to a master. In gPTP, for example domain numbers are used to establish multiple time domains in parallel in a network. These numbers help a slave to synchronize its clock to a certain time domain master. Until now, there is no way a 5G system can efficiently support multiple time domains as required by industrial automation applications. This is particularly important in case a large number of domains need to be supported, such as e.g. 32 domains, and a large number of UEs are connected to the 5G system.

Depending on how time signals are transported in the 5GS, and especially what transmission type (Broadcast, Multicast, Unicast) is chosen at the RAN, RAN knowledge about which UE needs which time domain signal may be very important. This is however not supported today.

The embodiments herein provide a method by which a UE and a BS such as a radio network node, e.g. a gNB, can provide multiple time signals to e.g. a TSN application running either on UE side or BS side and then let the 5GS know to which time domain a signal belongs to.

Figure 9:
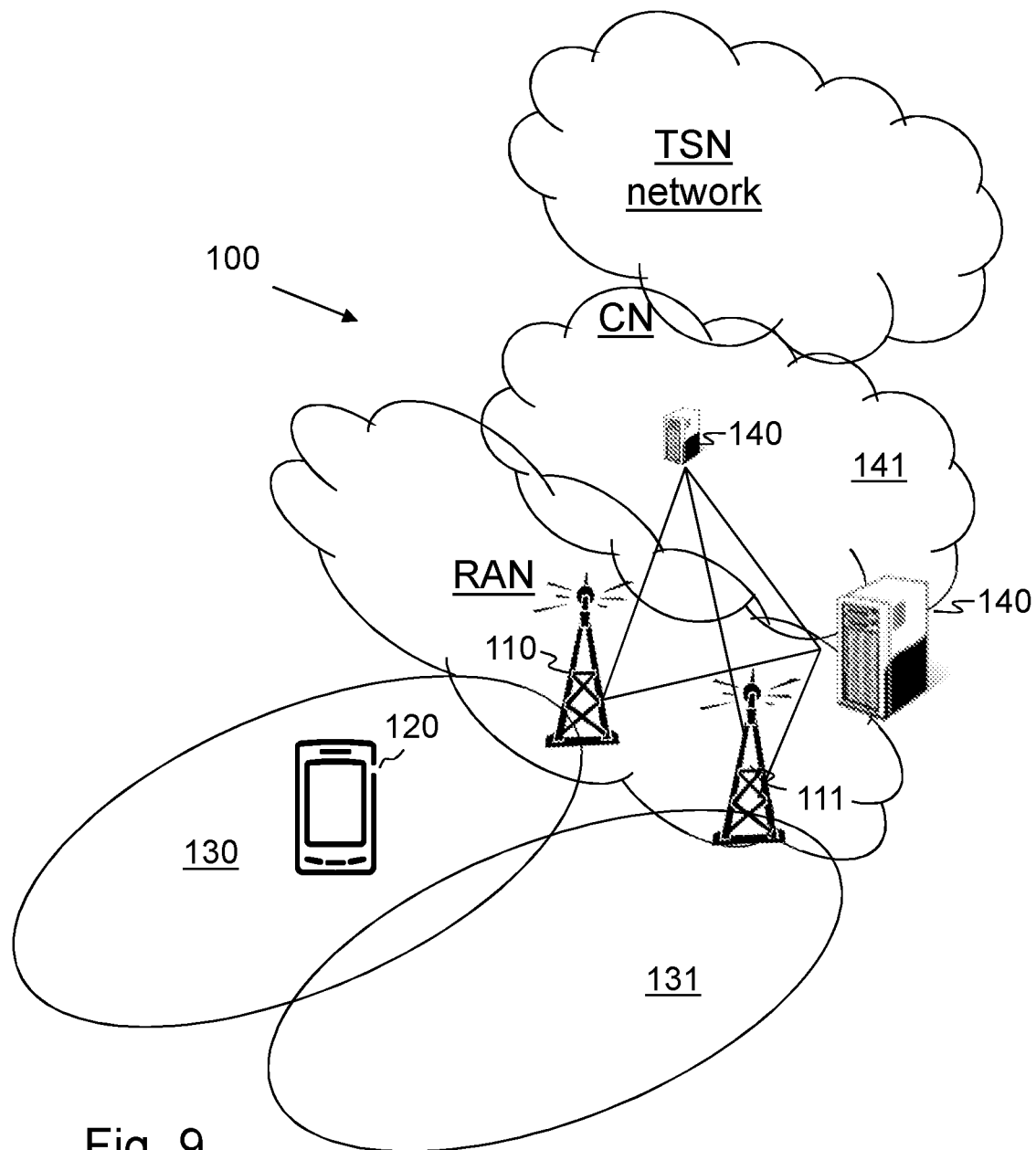
FIG. 9 is a schematic block diagram illustrating embodiments of a wireless communications network.

FIG. 9 depicts an example of a communications network 100 according to a first scenario in which embodiments herein may be implemented. The communications network 100 is a wireless communication network such as e.g. an 5GS, an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Long Term Evolution (LTE), LTE-Advanced, 5G, Wideband Code Division Multiple Access (VVCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the communication network 100, one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The UEs 120 may each be connected to one or more end stations such as one or more second end station. The second end station may e.g. be robots on a factory floor. In some embodiments, the UE 120 is connected to a group of end stations. One example of implementation may be a group of end stations being connected to a bridge, which bridge is connected to the UE 120.

The RAN comprises a set of radio network nodes, such as network nodes 110, 111 each providing radio coverage over one or more geographical areas, such as a cell 130, 131 of a radio access technology (RAT), such as 5G, LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

Figure 1:
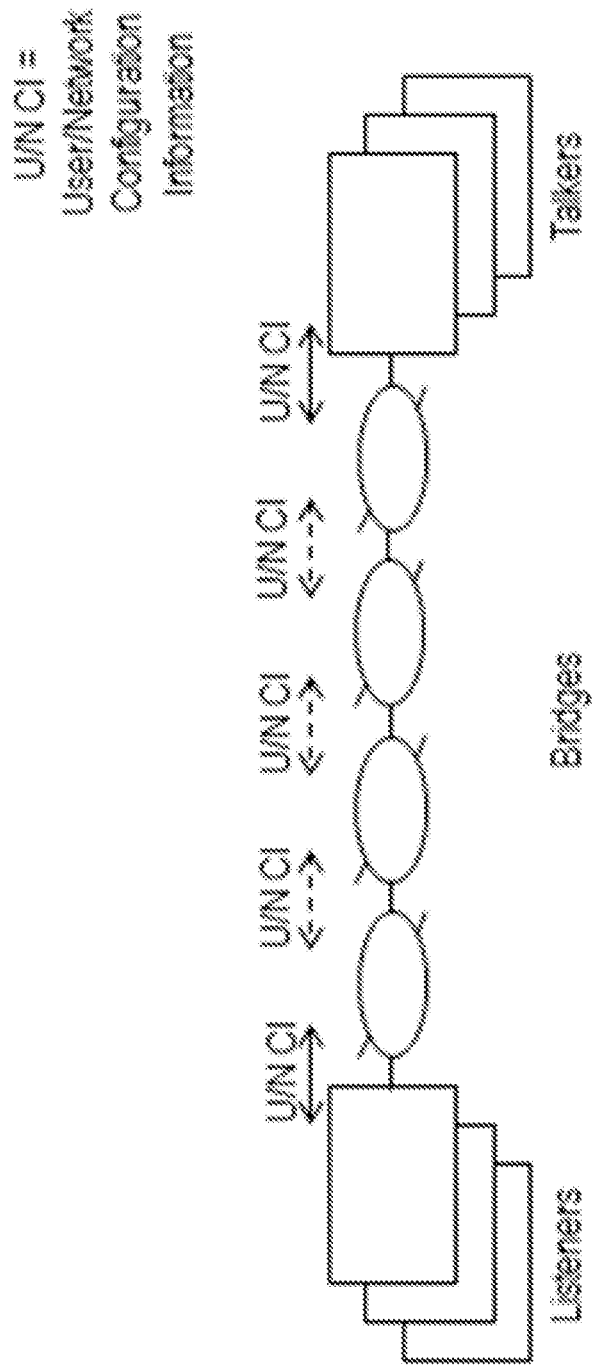
FIG. 1 is a block diagram illustrating a distributed TSN configuration model.
Figure 2:
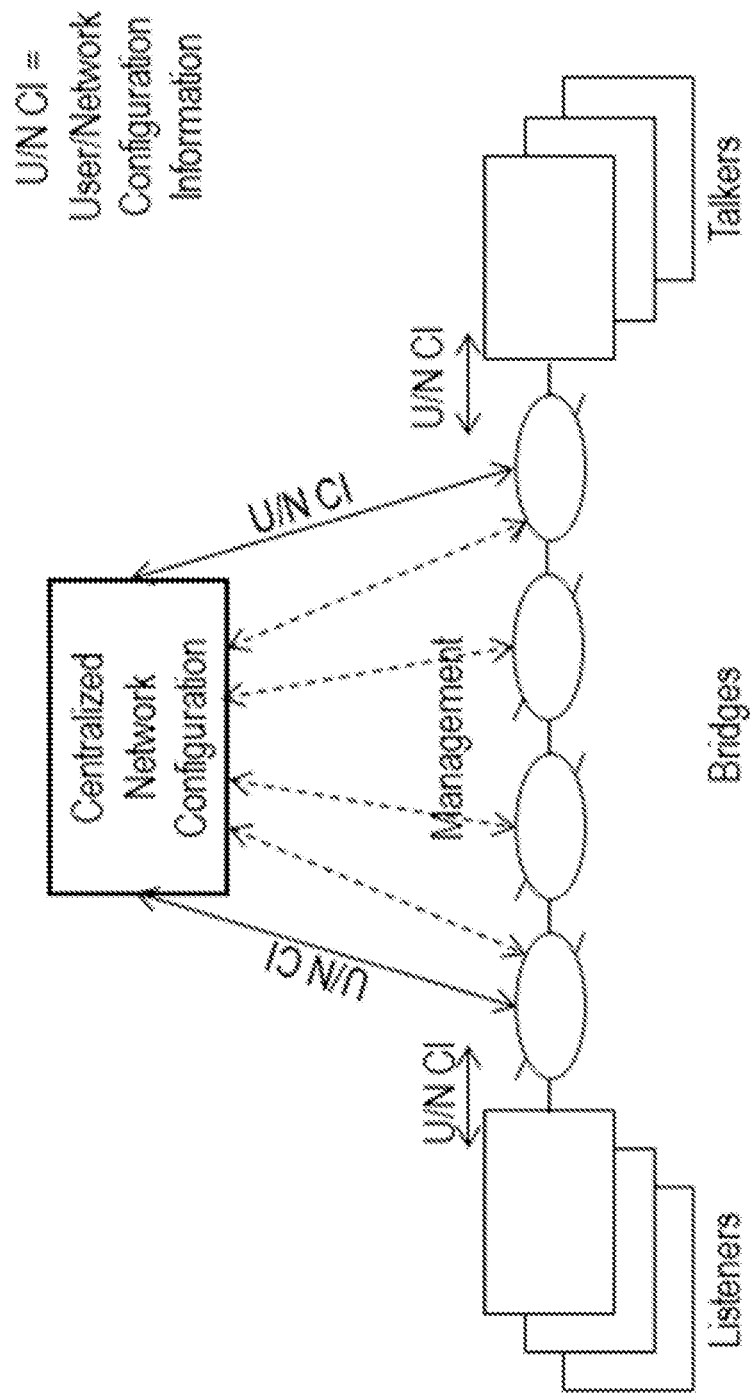
FIG. 2 is a block diagram illustrating a centralized TSN configuration model.
Figure 3:
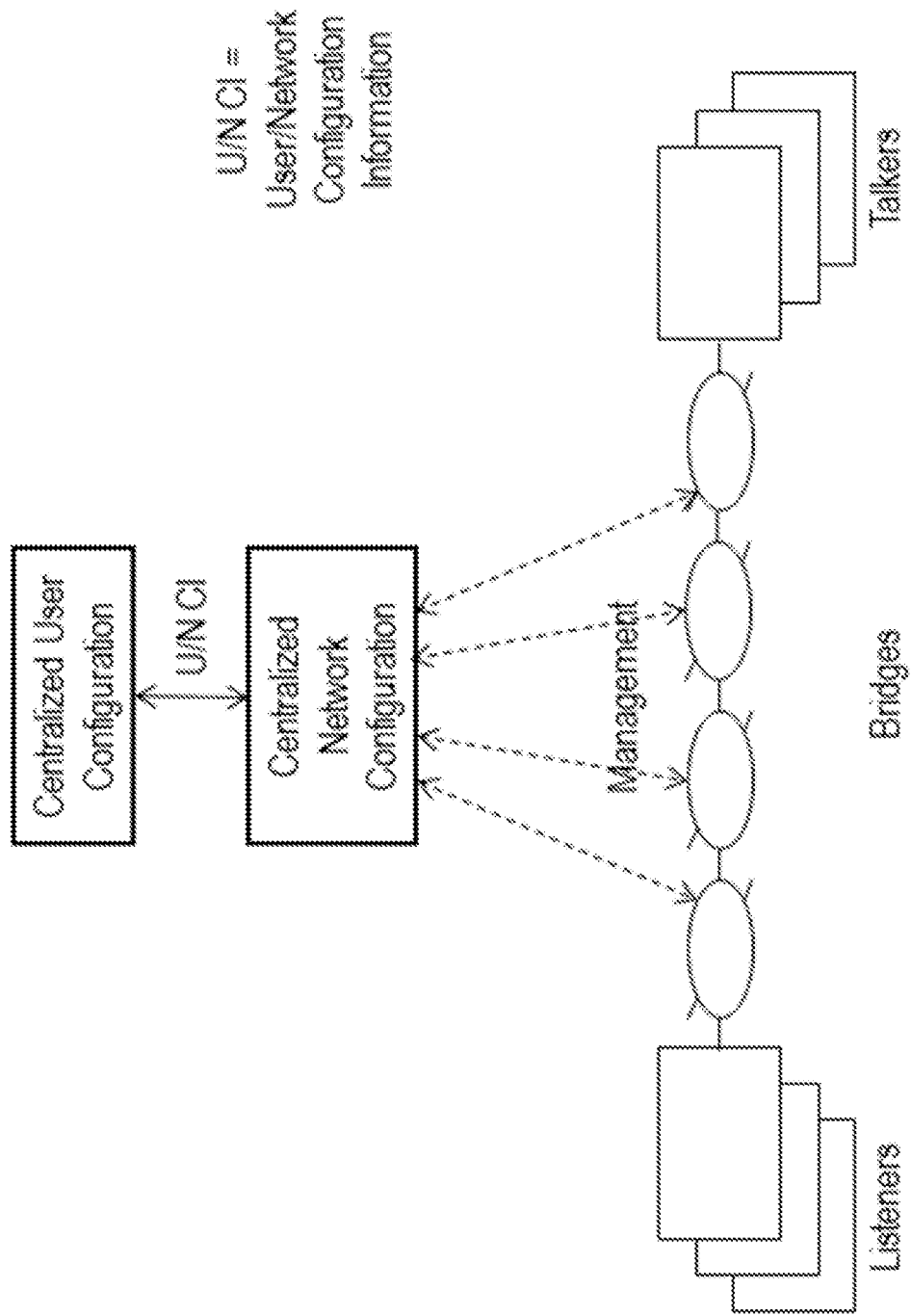
FIG. 3 is a block diagram illustrating a fully centralized TSN configuration model.

The UE 120 is located in the cell 130 of the network node 110, which is referred to as the serving cell, whereas the cell 131 of the network nodes 111 are referred to as neighboring cells. Although, the network node 110 in FIG. 1 is only depicted providing a serving cell 130, the network node 110 may further provide one or more neighboring cells 131 to the serving cell 130.

The communications network 100 may according to some embodiments herein communicate with nodes in an external TSN network. The TSN network may be connected to one or more end stations such as a second end station.

Note that although terminology from 3GPP 5G and LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

In the following, the embodiments herein will be described in further detail. In the below example, the wireless communications network is represented by 5GS.

According to some of the embodiments herein the 5GS such as a transmitting device in 5GS, may receive gPTP messages from an external network, such as a TSN network, in which e.g. a Grandmaster (GM) is deployed. The gPTP messages from the GM may be received either on a UE, such as the UE 120, or UPF side of the 5GS.

As multiple time domains are used in industrial networks, such TSN networks, as introduced above, there may be multiple signals arriving at the 5GS.

In the embodiments herein it is assumed that the gPTP frames are transparently transported in the 5GS. The wording "transparently transported in the 5GS" when used herein means that the gPTP frames together with time stampings are encapsulated into GTP-U packets, then they are transported inside 5GS using existing procedures and protocols in the similar way as other data packets. A time stamp is a stamp of a current time.

In this case it is particularly important to know about which nodes require which time domain signals, i.e. gPTP frames carrying to a certain domain Number, for cases where a large number of UEs are connected and a significant number of gPTP domains need to be supported, such as e.g. more than two gPTP domains, which is addressed by embodiments herein. Solutions for both uplink and downlink transmission of time signals are introduced.

The information about the time domains and which UE belongs to which time domain is particularly important for cases where a large number of UEs are connected and a significant number of gPTP domains need to be supported, such as e.g. more than two gPTP domains, which is addressed by embodiments herein.

The embodiments herein have the benefit that they allow end-to-end time synchronization with multiple time-domains. Thereby the 5GS system is now able to forward time signals from multiple time domains efficiently.

First embodiments herein will be described in a more general way together with FIG. 13 and FIG. 14. Then embodiments herein will be further exemplified and described more in detail together with FIGS. 10-12.

Figure 13:
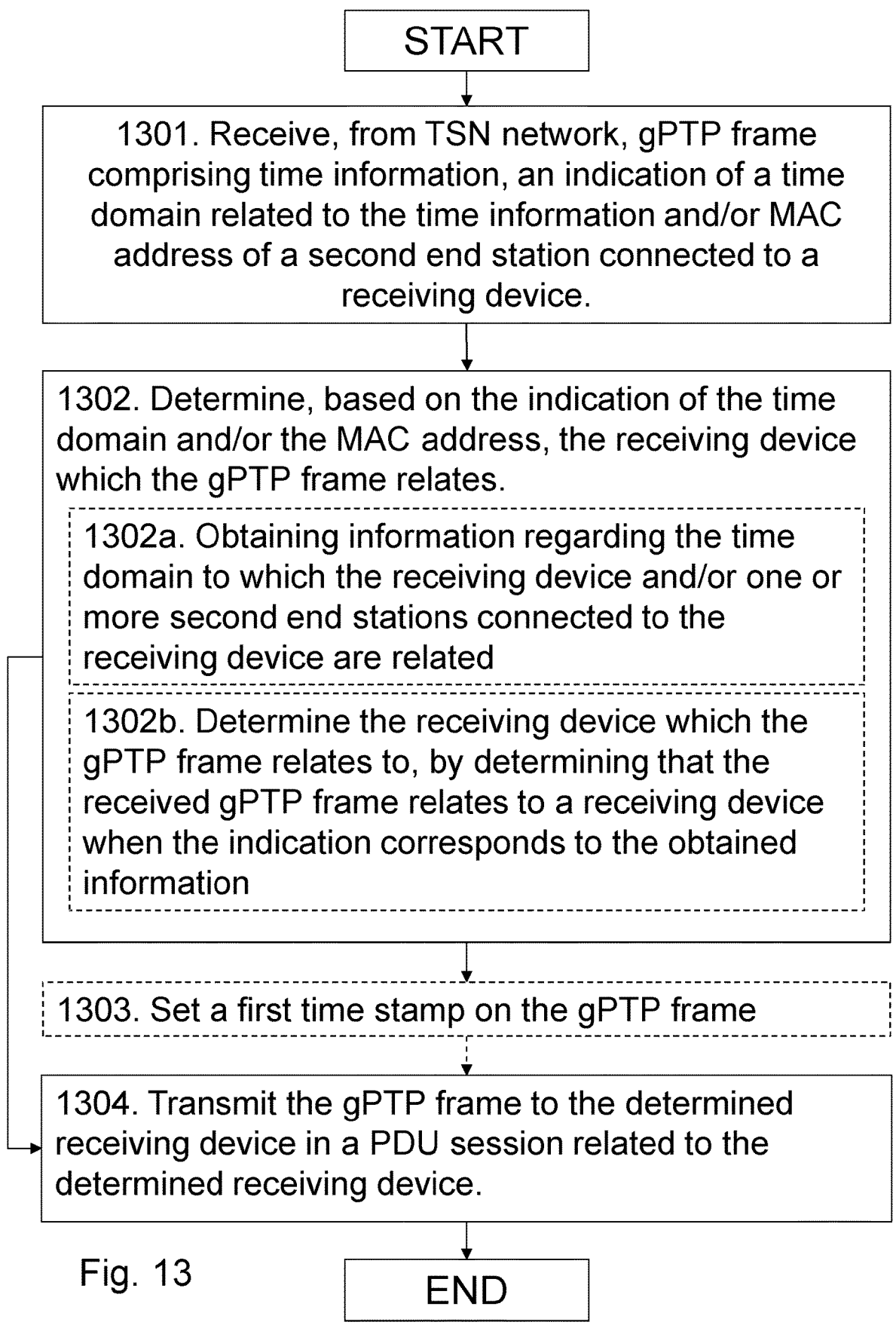
FIG. 13 is a flowchart depicting a method performed by a transmitting device according to embodiments herein.

FIG. 13 depicts methods according to example embodiments herein seen in the respective view of a transmitting device.

Figure 14:
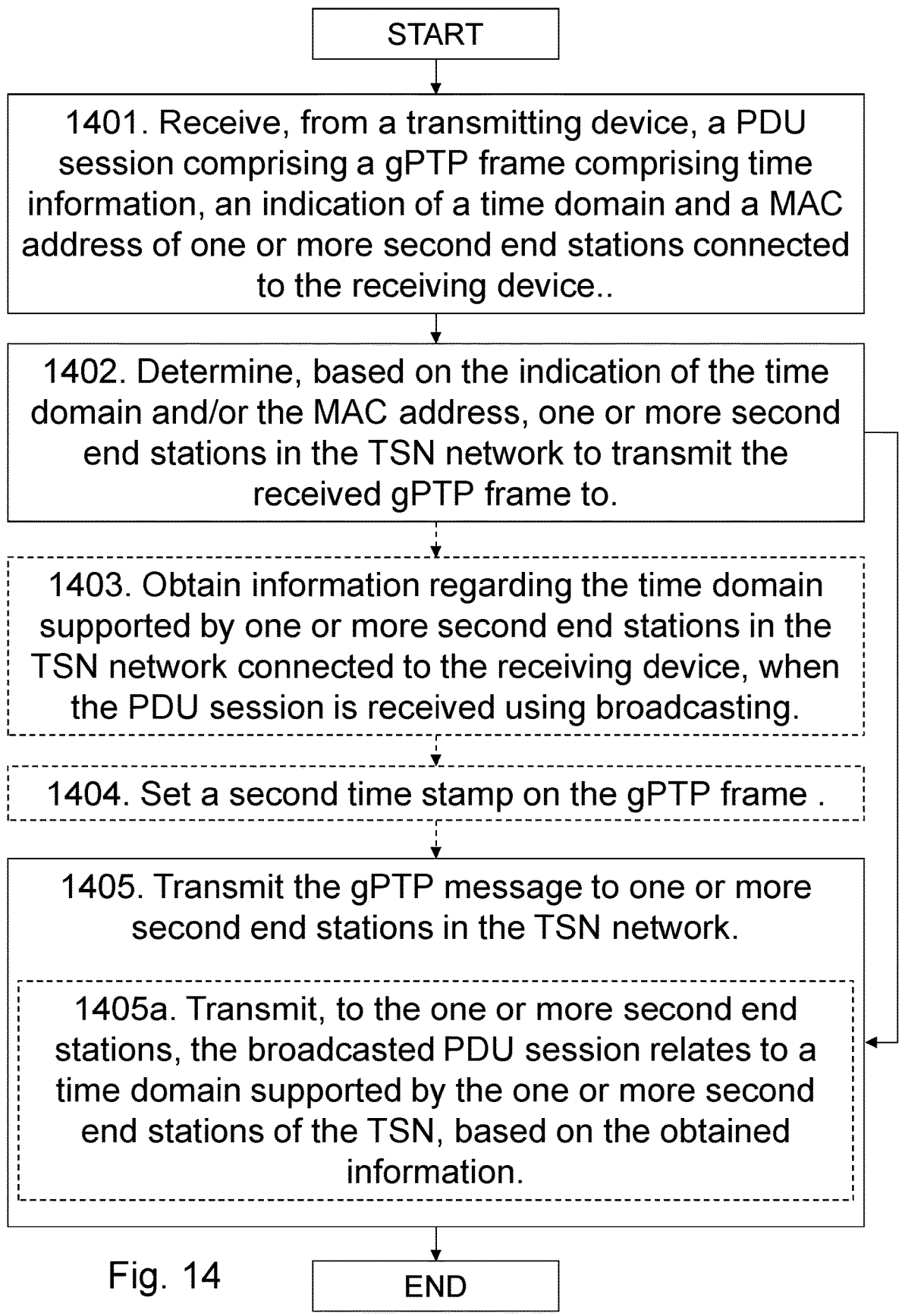
FIG. 14 is a flowchart depicting a method performed by a receiving device according to embodiments herein.

FIG. 14 depicts methods according to example embodiments herein seen in the respective view of a sending device.

The transmitting device may e.g. be a transmitting device X010, such as e.g. the UE 120 during UL transmissions or the network node 110 or the UPF during DL transmissions.

The receiving device is connected to one or more second end stations. The receiving device may e.g. be a receiving device X020, such as e.g. the UE 120 connected to one or more second end stations during DL transmissions, or the radio network node 110 or the UPF connected to the one or more second end stations during UL transmissions.

According to a first example scenario relating to DL, a gPTP frame e.g. generated from a GM, is to be transmitted from the TSN network, via the transmitting device such as a network node 110 or the UPF in the 5GS network to the receiving device such as the UE 120 in the 5GS network to be forwarded to the second end station in this example operating connected to the receiving device such as the UE 120 in the 5GS network.

According to a second example scenario relating to UL, a gPTP frame is to be transmitted from a first end station connected to the transmitting device such as the UE 120, via the transmitting device such as the UE 120 in the 5GS network to the receiving device such as the radio network node 110 or the UPF in the 5GS network to be forwarded to the second end station, in this example operating in the TSN network.

The TSN network uses multiple working clock domains, whereof one or more working clock domains are related to the gPTP frame.

When TSN uses multiple clock domains, the gPTP messages are coming from different working clock domains. One gPTP frame is only belonging to one working clock domain.

The wording "packets at ingress of a node" when used herein refers to any node(s) at 5G system that receives gPTP messages from TSN network.

The wording "packets at egress of a node" refers to any node(s) at 5G system from which gPTP messages are forwarded to the TSN network.

Figure 10:
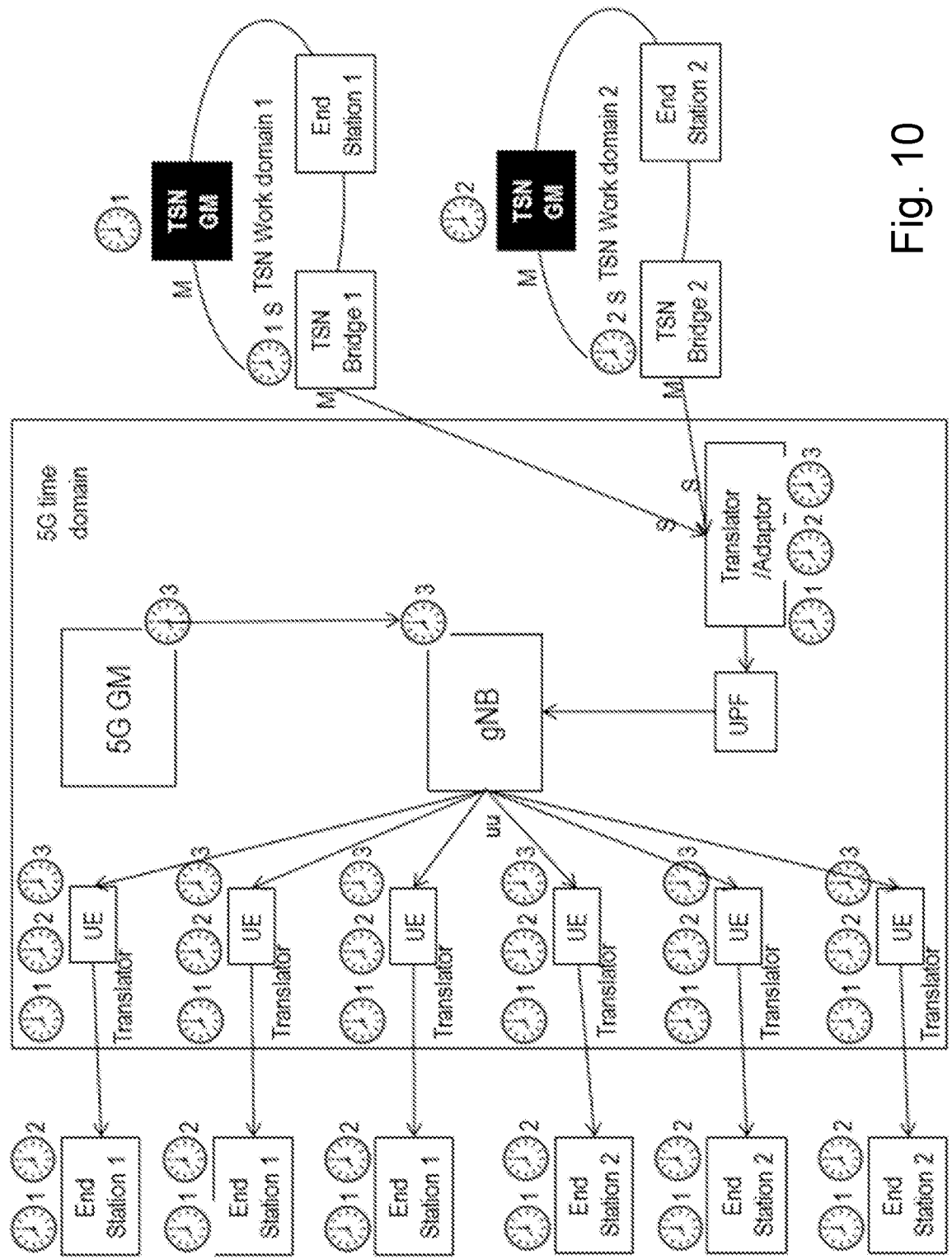
FIG. 10 is a schematic block diagram illustrating embodiments of a multiple time domain support in the 5GS using broadcast according to some first embodiments herein.

This may cover several embodiments:

Case1: As FIG. 10,11,12 shows, in a downlink direction, UPF side translator is the ingress of 5G system. The UE side translator is the egress.

Case2: (Not shown in figures.) For an uplink direction, the UE side translator is the ingress, and UPF side will be the egress.

Case3: (Not shown in figures.) The UE1 may be ingress, another UE may be egress.

FIG. 13 depicts methods according to example embodiments herein seen in the view of a transmitting device. FIG. 13 illustrates method actions performed by a transmitting device in a wireless communication system 100. The method is for handling gPTP signaling from the TSN.

The transmitting device may e.g. be the UE 120, the network node 110, the UPF and/or a translator function. The wireless communication system 100, may as mentioned above e.g. be a 3GPP wireless communication system 100, such as e.g. the 5G system.

The method may comprise one or more of the following actions which actions may be taken in any suitable order.

Action 1301:

The transmitting device receives the gPTP frame from the TSN, e.g. generated from GM in the TSN network. The wording "gPTP frame" when used herein may be interpreted as an Ethernet frame that comprises a gPTP message.

The gPTP frame may e.g. be an Announce message or a sync message. The gPTP frame is to be transmitted to a second end station connected to a receiving device such as e.g. a UE such as the UE 120. The transmitting device does not yet know who the receiving device is.

The gPTP frame may comprise time information, an indication of a time domain related to the time information and/or a MAC address of a second end station connected to a receiving device. This may mean that the gPTP frame may comprise any one out of:

Time information,
an indication of a time domain related to the time information, and
a MAC address of a second end station connected to a receiving device. The format or content of the gPTP frame may follow IEEE IEEE 802.1 AS standard or IEEE 1588v2 format.

Action 1302:

The transmitting device determines the receiving device which the gPTP frame relates to, based on the indication of the time domain and/or the MAC address.

When the transmitting device by some means may know some indications such as e.g. the second end station wanted domain indicator, then the UPF may determine the receiving device. If such a indication is not available, then the transmitting device will send all gPTP frames that is coming from different time domains to the UEs such as the UE 120, it is connected to.

Action 1302*a*:

In some embodiments, the transmitting device may determine the receiving device which the gPTP frame relates to by obtaining information regarding the time domain to which the receiving device and/or one or more second end stations connected to the receiving device are related. The transmitting device may obtain the information by receiving the information from the receiving device. The transmitting device may obtain the information by receiving a pre-configuration indicating which receiving devices are related to a specific time domain. The transmitting device may further obtain the information regarding the time domain supported by the one or more second end stations in the TSN, by receiving information from a TSN network controller, wherein the information comprises a receiving device identifier, such as e.g. a UE identifier, or a MAC address of the one or more second end stations.

Action 1302*b*:

The transmitting device may further determine the receiving device which the gPTP frame relates to, by determining that the received gPTP frame relates to a receiving device when the indication of the time domain or the MAC address comprised in the gPTP frame corresponds to the obtained information regarding the time domain to which the receiving device and/or the one or more second end stations connected to the receiving device are related.

Action 1303: The transmitting device may further set a first time stamp on the gPTP frame when the gPTP frame is received by the transmitting device, also referred to as time stamp ingress.

When transmitted, an egress time stamp is set, also referred to as recorded. The egress time stamp is not included in the gPTP frame. The time stamp information may not be a part of the gPTP frame which is different from when receiving it. When receiving the gPTP frame, the time stamp is set and included inside gPTP frame.

The first time stamp may be used to calculate a correction time for compensating for varying delays in the 3GPP wireless communication system 100. This is in order to be able to "transparently" carry the PTP time information across the 5GS, such as e.g., acting as a distributed transparent clock, or equalizing the delays on both directions so as to create a symmetric channel. It is the different between first time stamp and a second time stamp that may be used as a correction time.

In some embodiments, the gPTP message will be updated, i.e. modified with the egress timestamping (TSe) minus the ingress timestamping (TSi), i.e. the 5G residence time, and all 5G nodes are using the same time grand master. The difference between TSi and TSe is considered as the calculated residence time spent within the 5G system for this gPTP message expressed in 5GS time. In this way, the modified gPTP message may pass through the 5G system via the normal PDU session. All 5G nodes may use the same GM, which is 5G GM. The first time stamp may be set at the 5G transmitting side, the second time stamp may be set at 5G the receiving side. Between 5G transmitting and receiving, a PDU session is used. After correction, the modified gPTP is sent to the second end stations at the receiving side.

Action 1304: The transmitting device transmits the gPTP frame to the determined receiving device, such as e.g. the radio network node 110 or the UPF in UL and/or the UE 120 in DL. The gPTP frame is transmitted in a PDU session related to the determined receiving device. The transmitting device may be a radio network node or a UPF, and the gPTP frame may be transmitted using broadcasting. The transmitting device may further transmit the gPTP frame using multicasting or unicasting.

In the embodiments where the gPTP message was modified with the TSe-TSi, i.e. the 5G residence time, the modified gPTP message will pass through the 5G system via the normal PDU session.

FIG. 14 depicts the methods according to example embodiments herein seen in the view of a receiving device. FIG. 14 illustrates the method actions performed by the receiving device, such as e.g. the UE 120, the radio network node 110, the UPF and/or the translator function, in the 3GPP wireless communication system 100, such as e.g. the 5G system, for handling gPTP signaling from the TSN. The receiving device may herein also be referred to as a receiving entity.

Action 1401:

The receiving device may receive, from the transmitting device, such as e.g. the radio network node 110, the UPF and/or the UE 120, a PDU session comprising a gPTP frame. The gPTP frame in turn comprises a time information, an indication of a time domain related to the time information and/or a MAC address of one or more second end stations connected to the receiving device. The PDU session may be received using multicasting, unicasting or broadcasting.

Action 1402:

The receiving device may determine, based on the indication of the time domain and/or the MAC address, one or more second end stations in the TSN network to transmit the received gPTP frame to.

Action 1403:

When the PDU session is received as a broadcasted message, the receiving device may further obtain information regarding the time domain supported by the one or more second end stations in the TSN network, which end stations are connected to the receiving device. The information regarding the time domain supported by the end stations in the TSN, may e.g. be obtained by receiving a gPTP message, such as e.g. a gPTP Announce message, delivered periodically by the one or more second end stations. The information regarding the time domain supported by the one or more end stations in the TSN, may in a further embodiment be obtained by receiving information from a TSN network controller, wherein the information comprises a receiving device identifier, such as e.g. a UE identifier, or a MAC address of the one or more second end stations.

Action 1404:

The receiving device may further set a second time stamp on the gPTP frame when the PDU session comprising the gPTP frame is received and/or the gPTP frame is transmitted by the receiving device. The second time stamp may be used in combination with the first time stamp received on the gPTP frame, to calculate a correction time for compensating for varying delays in the 3GPP wireless communication system 100.

Action 1405:

The receiving device transmits the gPTP frame to the one or more second end stations in the TSN network. The gPTP frame comprises the time information and the time domain related to the time information comprised in the PDU session.

Action 1405a:

The receiving device may transmit, to the one or more second end stations, the broadcasted time information when the broadcasted PDU session relates to a time domain supported by the one or more second end stations of the TSN, based on the information obtained in action 1403. Hence, broadcasted time information relating to just the time domain supported by the end station of the TSN which is connected to the receiving device will be transmitted to the end station by the receiving device.

Embodiments herein may be implemented in the 5G network being designed to support various industry use cases such as replacing the wires for controlling endpoints such as the robots on the factory floor. Those kinds of control systems require very strict latency demands on the control data, which the 5G system is designed for. Further, the robots also often needs to be synchronized and hence are connected to a TSN. The TSN requires that the end-stations, e.g. robots are synchronized. The synchronization is done using gPTP, which carries various messages in order to provide the synch.

According to an example embodiment herein, the gPTP messages that are received at the network node 110, UPF or the UE 120, include a Time Translator. The gPTP message will be altered with the ingress and egress times of the message arrival time. At respective 5G endpoint such as the UE 120, the network node 110 or the UPF, the gPTP message will be updated with the TSe-TSi, i.e. the 5G residence time, and all 5G nodes are using the same time grand master.

The modified gPTP message will pass through the 5G system via the normal PDU session.

In the following, the embodiments herein will be described and explained in further detail.

Grandmaster on UPF side of the 5GS—Downlink

The 5GS forwards gPTP frames end-to-end, i.e. a TSN source node, such as e.g. the first end station, supporting a given working clock exchanges gPTP frames with a receiving UE, such as e.g. the UE 120, or with an receiving end station, such as e.g. the second end station, associated with that UE, which gPTP frames carry time information. Each gPTP frame may comprise the domainNumber header field which indicates the time domain the gPTP frame belongs to. The gPTP frames may need to be transported in PDU sessions to a UE, such as e.g. the UE 120, or to a plurality of UEs. The details of the related solutions depend on the specific mechanism that is implemented in order to "transparently" carry the PTP time information across the 5GS, such as e.g., acting as a distributed transparent clock, or equalizing the delays on both direction so as to create a symmetric channel. In this case there is no need for the 5GS to participate in the BMCA.

If a Broadcast of gPTP Frames is Used in the 5GS:

In case a broadcast of gPTP frames is performed in the 5GS instead, e.g. by means of the gNB, such as the network node 110, then the UE, such as e.g. the UE 120, or UEs need to decide whether they are listening to a certain broadcast or not. This may be performed in a similar manner as in the first embodiment above by checking whether any device connected to the UE sends Announce messages belonging to a specific PTP domain. The UE may not listen to the specific gPTP time domain broadcast any longer or not forward any gPTP frames if the connected end stations or end stations is/are not operating in this PTP domain. This is illustrated in FIG. 10 for the case where the UE forwards all broadcasted gPTP frames or FIG. 11 where the UE only forwards relevant gPTP frames to the respective end stations. The UE may also send for example gPTP frames such as e.g. Announce messages to end-stations to check for replies to certain domain numbers in order to learn which end-stations needs which time domain signal.

According to the example of FIG. 10, it is assumed that every UE already is connected to the UPF, e.g. has a PDU session. In DL the case, UPF knows the UEs such as the UE 120, that the UPF is connected to. The UPF may simply forward all gPTP messages from TSN network to all UEs that are connected, similar to multicast/broadcast.

Figure 4:
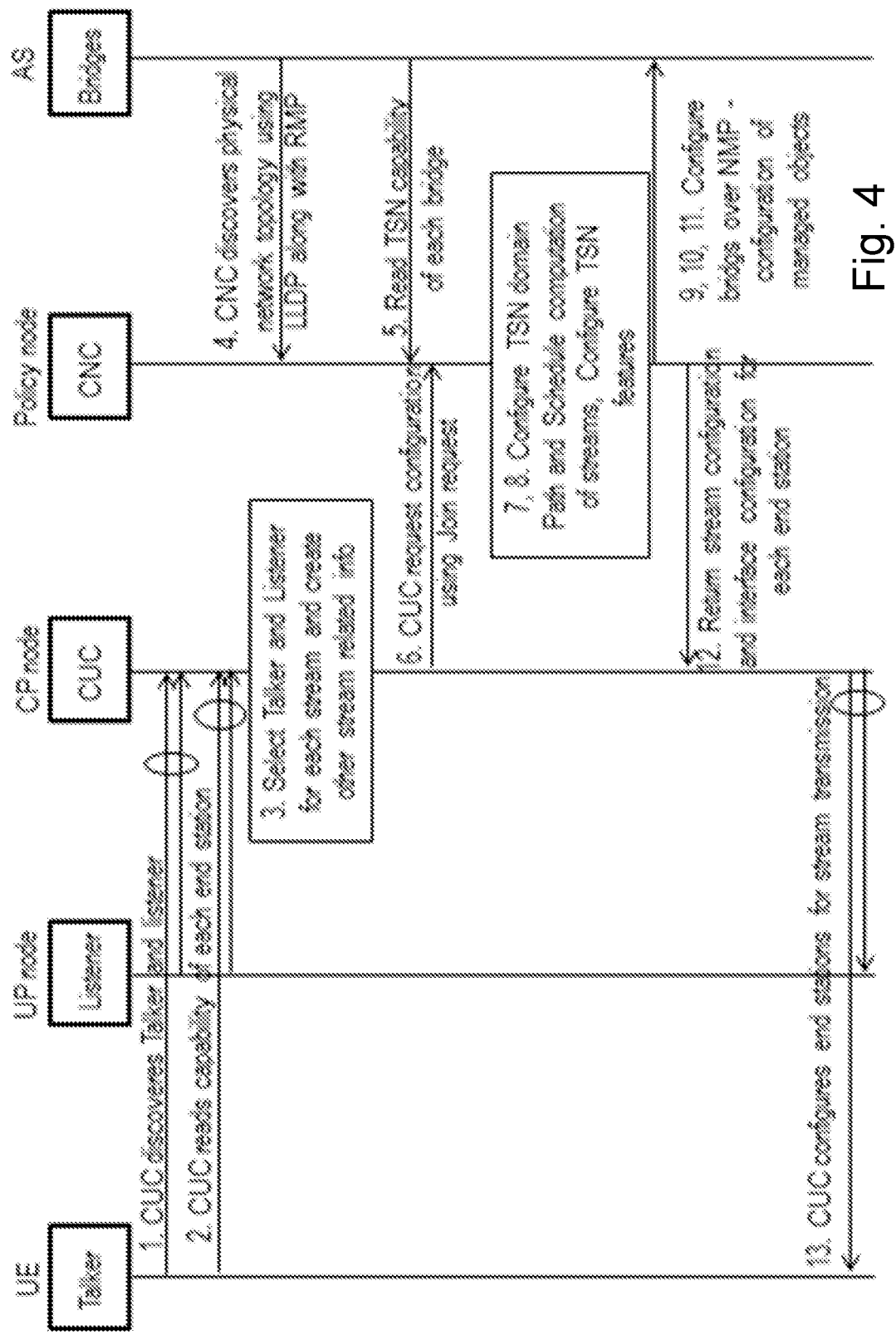
FIG. 4 is a flowchart illustrating a configuration of a TSN stream.
Figure 5:
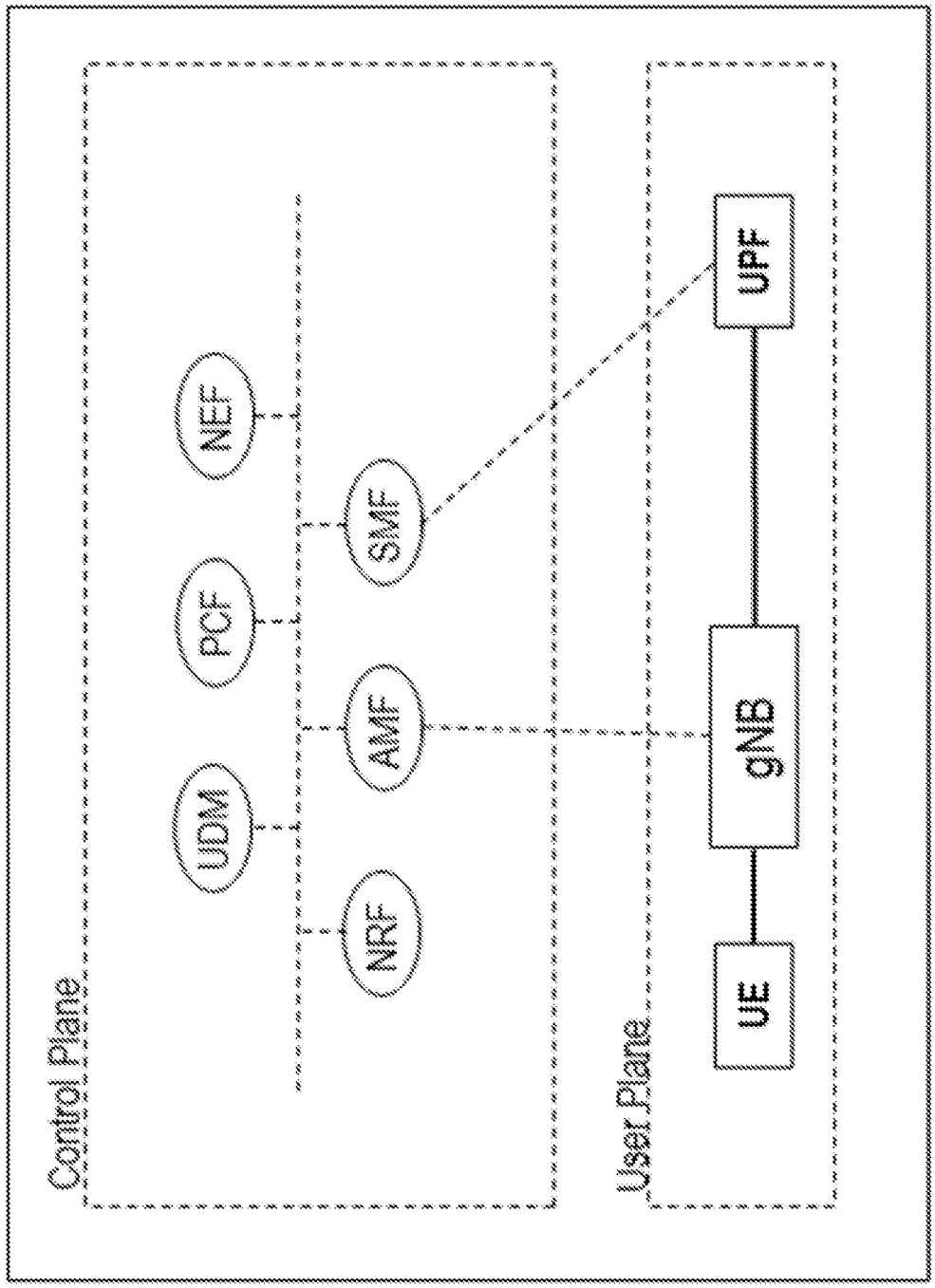
FIG. 5 is a schematic block diagram illustrating an overview of a 5G network architecture.
Figure 6:
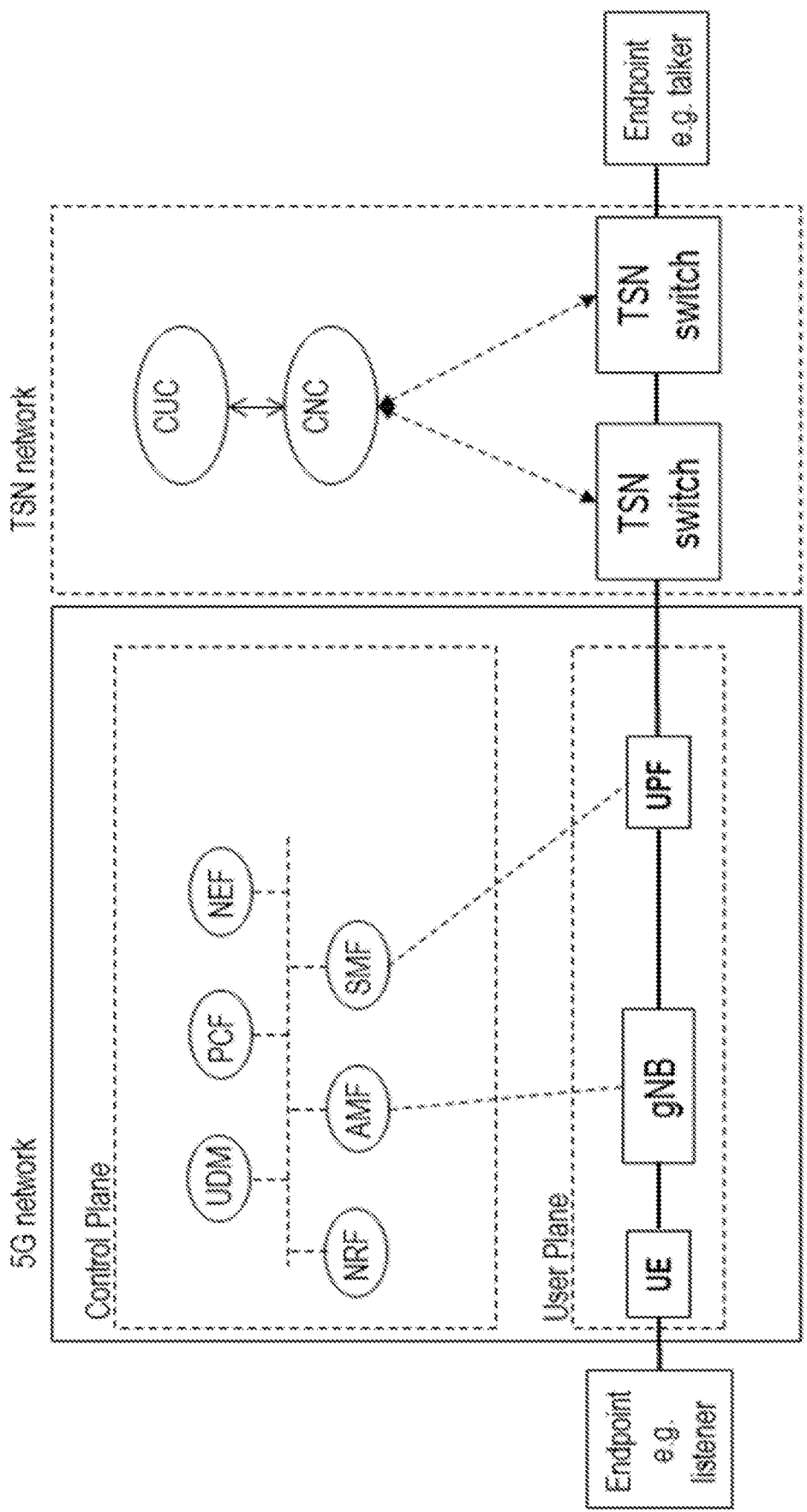
FIG. 6 is a schematic block diagram illustrating an exemplified 5G-TSN interworking architecture.
Figure 8:
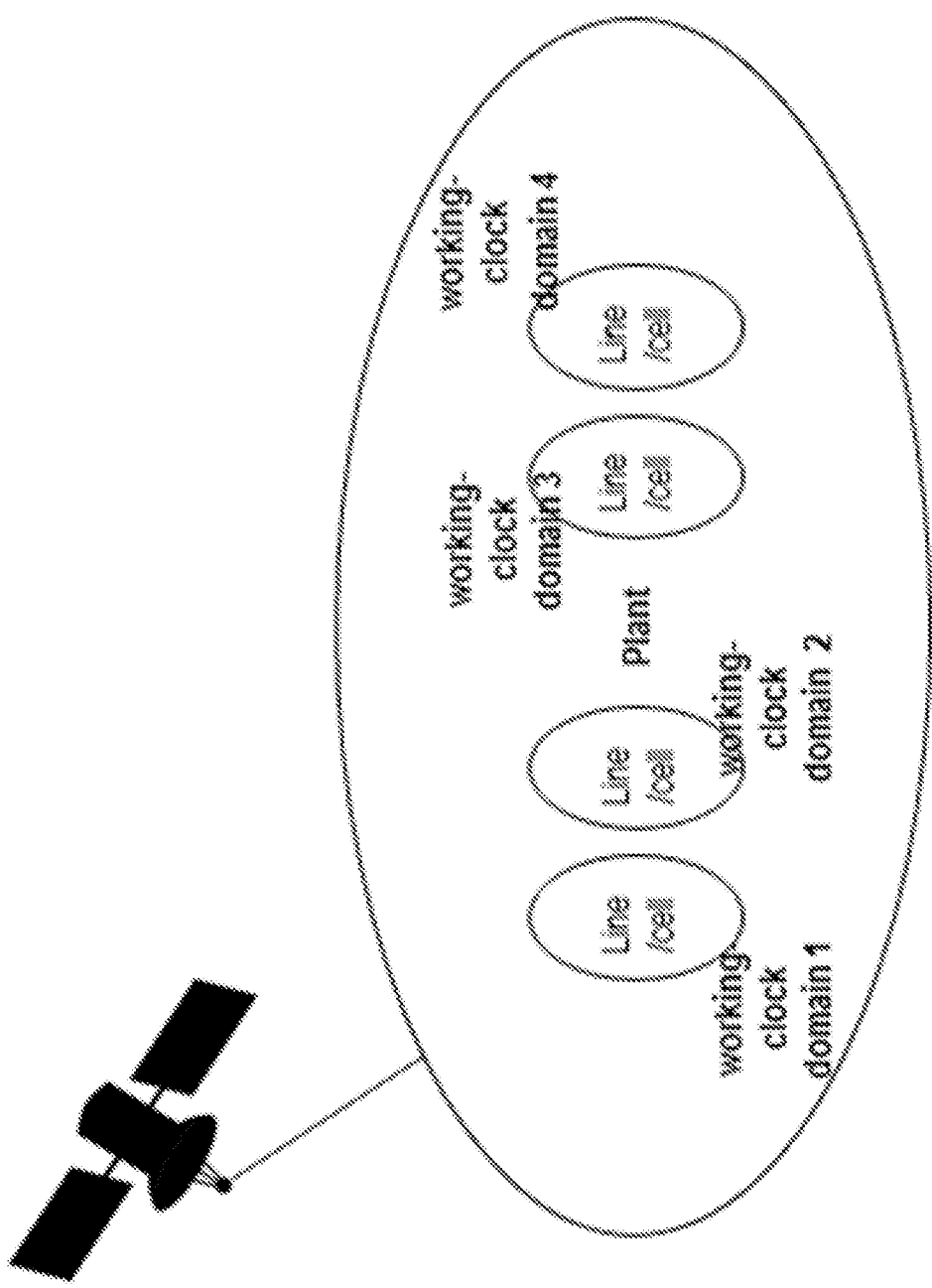
FIG. 8 is a block diagram depicting an exemplary use of multiple TSN gPTP time domains in a factory plant.

Every UE may have a translator, such as a device-side TSN Translator (see 3GPP TS 23.501). E.g. see TS 23.501, Figure 4.4.8.2-1: System architecture view with 5GS appearing as TSN bridge. The translator may be either standalone or integrated inside UE. The UPF side Translator may be referred to as Network-Side TSN translator.

If a Unicast or Multicast of gPTP Frames is Used in the 5GS:

Ingress frames to the 5GS will carry a multicast destination MAC address—the 5G network (for example the UPF) needs to decide to which UE (i.e. PDU sessions) it will forward gPTP frames to; gPTP frames might be detected by the PTP-specific Ethertype field.

In one embodiment, an end station connected to a UE, such as e.g. the UE 120, will generate Announce messages carrying information on the gPTP domain (domainNumber carried in the PTP header) it is operating or a 5GS node may use for example Announce messages to detect the interests of end stations. A node in the 5GS, like for example the UPF may learn which UE, respectively end stations behind a UE, such as e.g. the UE 120, are interested in which gPTP messages and establish for example rules for routing incoming gPTP frames accordingly. Any follow up/sync messages are only transmitted to UEs interested in these gPTP packets, which are these ones that operate in that specific gPTP domain; a UE such as e.g. the UE 120, will transparently forward gPTP messages from an end station or end stations it is connected to, to for example the UPF to learn about end-stations' needs. Example of this embodiment:

gPTP frames (for example an announce message or sync message or other) arrive at the UPF from an external TSN network; these frames carry the gPTP multicast Ethernet destination MAC address and a specific domainNumber that indicate the time domain they are referring to;

The UPF does not know at that point which UE is interested in frames from this time domain (domainNumber) as the MAC address indicates a multicast; therefore it sends all or a subset of gPTP frames or a specific gPTP frame (like an Announce message) to all UEs or any subset of relevant UEs (Option A). In addition or as another solution (Option B), end stations send any gPTP frames to the 5GS themselves that the UE will forward to the 5G network;

(Option A) A UE, such as e.g. the UE 120, that receives gPTP frames from the 5G network will forward them to an end station it is connected to. If the end station or any other peer connected to that end station is interested in gPTP frames from this time domain (by checking the domainNumber) it will reply to these gPTP frames in a way it is defined in the gPTP protocol. This is an approach that could be applicable in case the 5GS emulates the behavior of a PTP link, where the pdelay messages are exchanged across the 5G system. These packets are forwarded by the UE back to the 5G network which allows the 5G network to detect which UE is interested in frames from which time domain;

(Option B): A UE, such as e.g. the UE 120, receives for example an Announce message or any other PTP message from an end station or multiple end stations; the UE forwards them to the 5G network; based on the domainNumber carried by the Announce messages the 5GS learns the correct domainNumber to be sent to the end station or stations or UE or UEs respectively.

Figure 12:
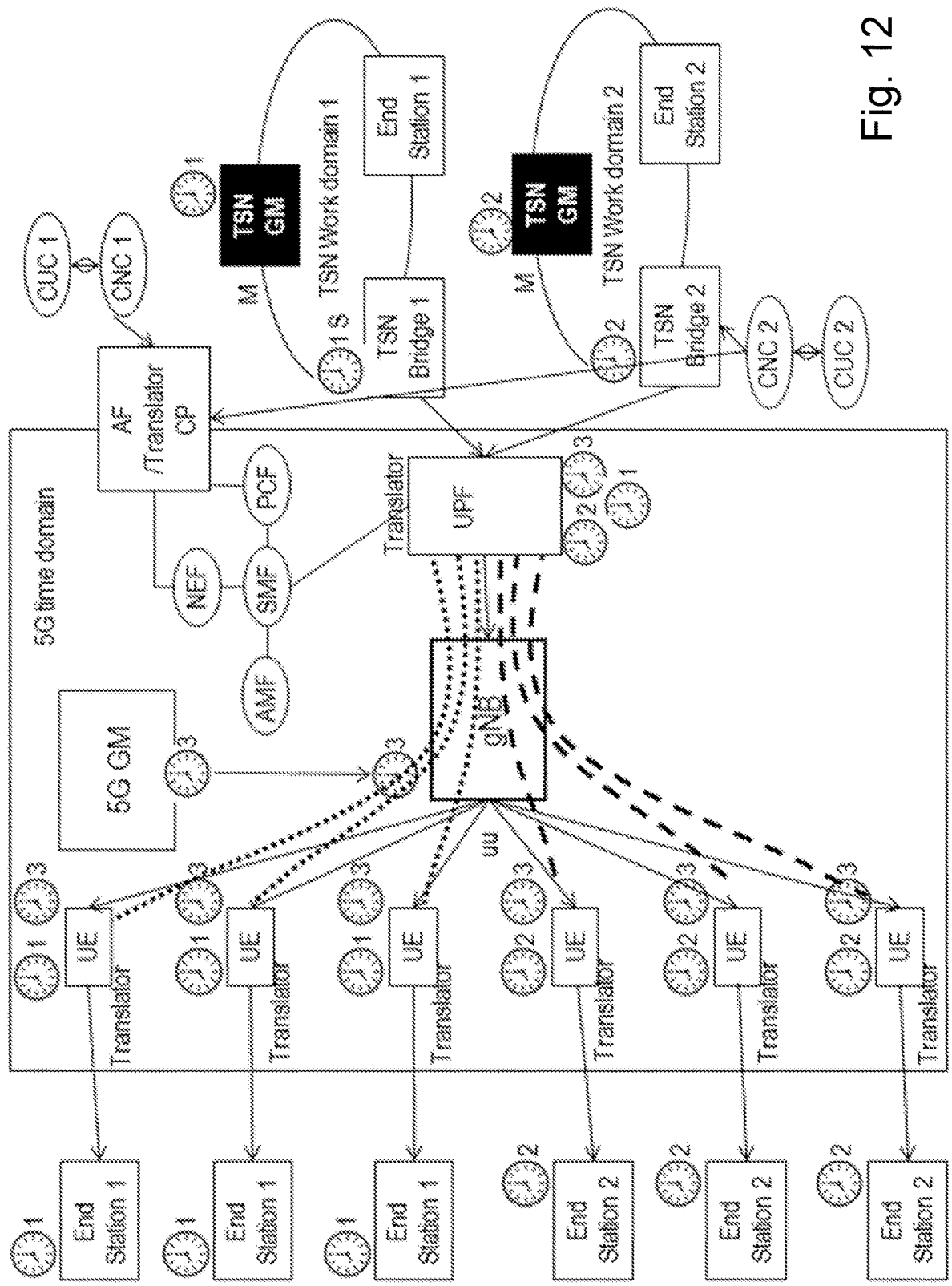
FIG. 12 is a schematic block diagram illustrating embodiments of a multiple time domain support in the 5GS according to some third embodiments herein.

According to another embodiment it may be pre-configured in the 5G network, which UEs will receive frames from a specific time domain; the frames may be forwarded in UPF to PDU sessions based on the domainNumber. The SMF may be an entity configuring filters in UPF at setup or modification of PDU sessions. In one way, the 5GS will obtain information from the TSN network about which time domain signal need to be directed to which UE i.e. UE identifier, or MAC address of an end station connected to the UE respectively. This may e.g. obtained from the external TSN CNC towards the Application Function (AF) when the CNC sets up TSN domains in the TSN network. The CNC may announce which time domain signals need to be forwarded to which port, i.e. UE or MAC address. AF may trigger any other core network function to set the right filter or rules in UPF to forward gPTP frames to the right PDU sessions using domainNumbers. This is illustrated in FIG. 12 below. In detail:

1. The CUC may know exactly what clock domain an end station wants.
2. The CUC may then tell, which may also be referred to as instruct, the CNC to configure the 5G "bridge" (5G system modeled as a bridge/time aware relay). e.g. CNC asks 5GS to setup a link between northbound of 5G bridge and southbound of the 5G bridge, so that the correct timing can be delivered to the corresponding end station (e.g. from which ingress port to which egress port).

3. The 5GS may receive, on the AF which may comprise the translator function, information from the CNC and may translate the CNC command to 5GS signaling, which may also be referred to as 3GPP signaling. In the IEEE P802.1AS-rev document it is referred to as an external port configuration that may be performed by a CNC to define the gPTP rapid spanning tree inside a switch, or in our case inside the 5GS. If the external port configuration is available as information from a CNC than a BCMA is no longer required. Ports can be configured by the CNC to different roles like Master-Port, SlavePort, PassivePort, or DisabledPort which can be interpreted into where each time domain signal need to be routed in the 5GS according to the IEEE P802.1AS-rev standard. The 5GS internal signaling from the AF is used to e.g. setup/update PDU sessions from the UPF to the UE, in this case only the selected/filtered clock domain will be transferred to the corresponding UE/end station.

General

For all embodiments described above, such as e.g. unicast or broadcast, it is further not relevant how the gPTP are transported in the 5GS, besides whether the gPTP frame is unicasted, multicasted or broadcasted to the UE, such as e.g. the UE 120. This may comprise time stamping of gPTP frames in the 5GS ingress and egress to calculate a correction time and compensate varying delays in the 5GS. This is shown in FIG. 10, FIG. 11 and FIG. 12 in which the time of the 5GS is added to the message when the message enters the 5GS.

It is not specified whether the 5GS may need to transmit all gPTP packets (Sync, Follow_up, Pdelay_request, Pdelay_response, PDelay_Response_Follow_up, Announce etc.) or just any subset of them over the RAN, like for example only Follow-Up messages containing the actual time stamps and then any not transmitted packet could been created, e.g. on the UE side, to ensure a valid gPTP communication handling with any connected end station. According to one embodiment, at least one gPTP frame will be transmitted periodically carrying all necessary information (domainNumber, timestamp, etc.). The gPTP frames may be transmitted as data packets. Furthermore, it is also possible that an Internet Protocol (IP) is used as for transporting the gPTP frames. All embodiments described herein may be applicable in a similar manner in the case where IP is used above Ethernet on Layer 3 (L3).

Figure 11:
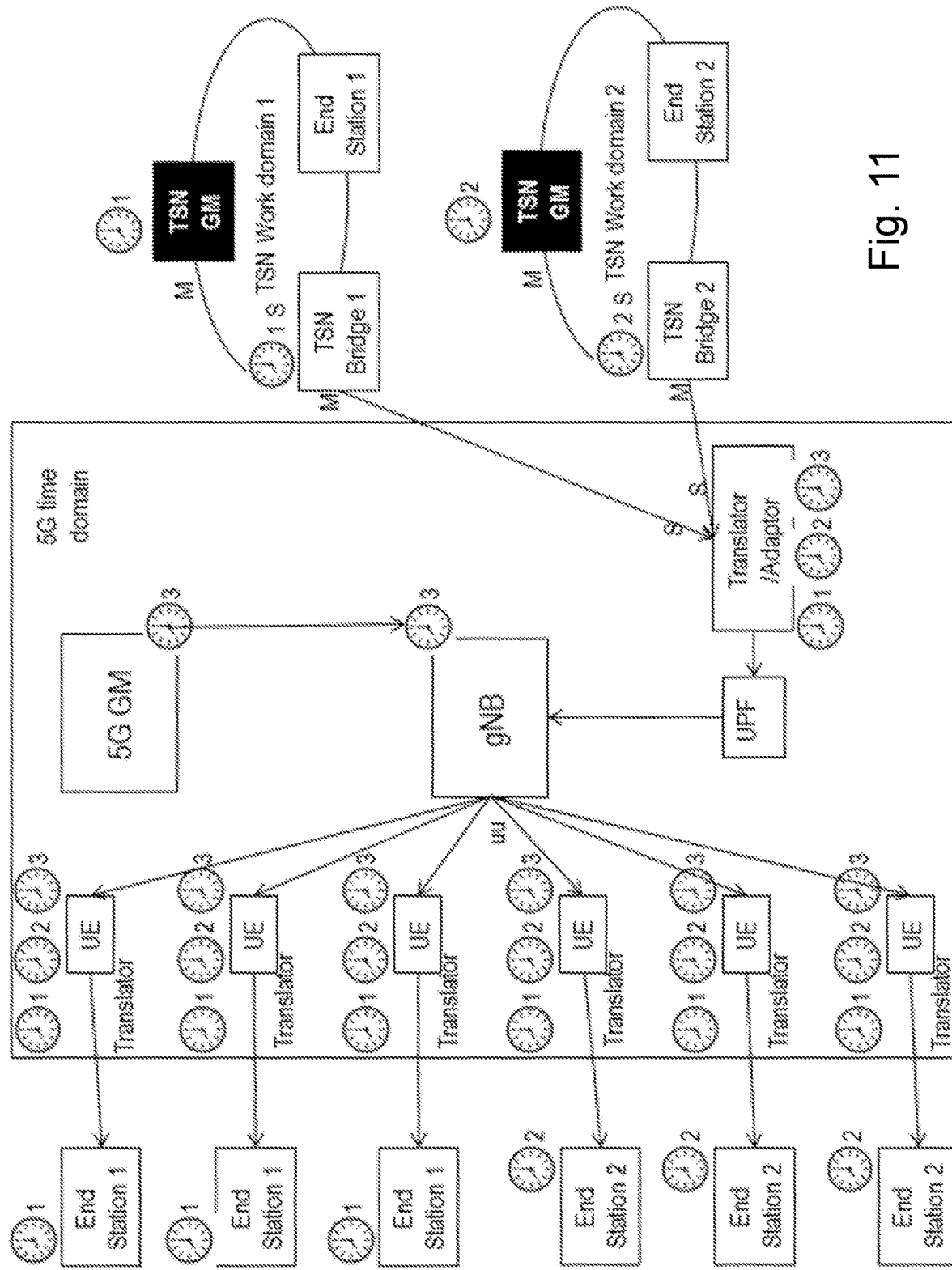
FIG. 11 is a schematic block diagram illustrating embodiments of a multiple time domain support in the 5GS where only relevant gPTP frames according to some second embodiments herein.

The translator function as illustrated in FIG. 11 and FIG. 12 may be an individual entity or may be part of the UPF function. The translator function may send clock/time domains to UEs via Point-to-Point PDU sessions or may send multiple flows inside the PDU session. The translator function may also be a transmitting device according to the example embodiments described herein. FIG. 12 shows an example of an embodiment in which the TSN CNC provides input to the UPF and/or the gNB, such as the network node 110, on how to forward the time domain signals. In the scenario shown in FIG. 12 the gPTP frames are forwarded to the receiving device, such as e.g. the UE 120, by the UPF using unicast and/or multicast.

Grandmaster on the UE Side of the 5GS—Uplink

If the grandmaster is located on the UE side of the 5GS, then the UE, such as e.g. the UE 120, needs to forward the time information to the gNB, such as the network node 110. In this case the UE may be the transmitting device, and the gNB and/or the UPF may be the receiving device. The UE may receive gPTP messages from the TSN and will therefore be time aware. The 5GS may require information regarding the time domains in order to be aware about to which time domain the time information forwarded from the UE belongs to.

The UE may always use unicast to forward gPTP frames to the 5G network. Based on the gPTP frame headers, the network is able to determine the time domain. According to one embodiment herein it might not be necessary to transmit all gPTP frames but only a subset and filter others at the UE side. The 5G network, for example at the UPF, may re-create any not transmitted gPTP frames.

According to a special case it may be necessary to forward the time signal to another UE instead of to an external TSN network, such as a Data Network. In this case the 5GS may use one of the methods introduced above in relation to the embodiments related to Downlink, obtaining the information regarding the time domain number from the frame headers it receives.

Figure 15:
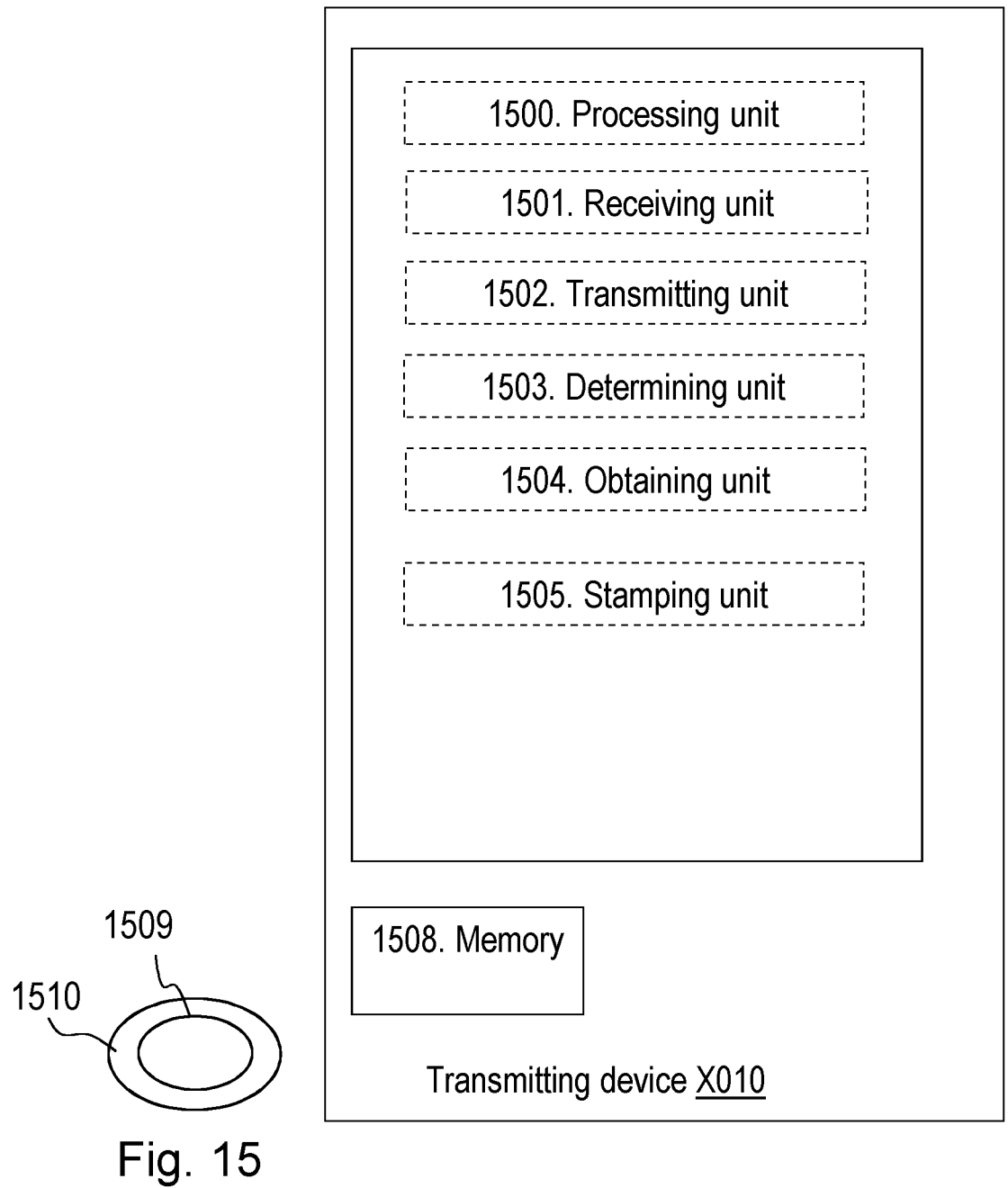
FIG. 15 is a schematic block diagram illustrating some first embodiments of a transmitting device.

FIG. 15 is a block diagram depicting the transmitting device X010, such as e.g. the UE 120 during UL transmissions or the network node 110 or the UPF during DL transmissions, in a 3GPP wireless communication system 100, such as e.g. a 5G system, for handling gPTP signaling from a TSN.

The transmitting device X010 may comprise a processing unit 1500, such as e.g. one or more processors, a receiving unit 1501, a transmitting unit 1502, a determining unit 1503, an obtaining unit 1504, and/or a stamping unit 1505 as exemplifying hardware units configured to perform the method as described herein for the transmitting device X010.

The transmitting device X010 may be configured to, e.g. by means of the processing unit 1500 and/or the receiving unit 1501 being configured to, receive, from a TSN network, a gPTP frame, such as e.g. an Announce message or a sync message, wherein the gPTP frame comprises time information, an indication of a time domain related to the time information and/or a MAC address of a second end station connected to a receiving device.

The transmitting device X010 may be configured to, e.g. by means of the processing unit 1500 and/or the determining unit 1503 being configured to, determine, based on the indication of the time domain and/or the MAC address, the receiving device which the gPTP frame relates to.

The transmitting device X010 may be configured to, e.g. by means of the processing unit 1500 and/or the transmitting unit 1502 being configured to, transmit, to the determined receiving device, such as e.g. the radio network node 110 or the UPF in UL and/or the UE 120 in DL, the gPTP frame in a PDU session related to the determined receiving device.

The transmitting device X010 may be configured to, e.g. by means of the processing unit 1500 and/or the obtaining unit 1504 being configured to, obtain information regarding the time domain to which the receiving device and/or one or more second end stations connected to the receiving device are related.

The transmitting device X010 may be configured to, e.g. by means of the processing unit 1500 and/or the obtaining unit 1504 being configured to, obtain the information regarding the time domain supported by the one or more second end stations in the TSN, by being configured to receive information from a TSN network controller, wherein the information comprises a receiving device identifier, such as e.g. a UE identifier, or a MAC address of the one or more second end stations.

The transmitting device X010 may be configured to, e.g. by means of the processing unit 1500 and/or the determining unit 1503 being configured to, determine that the received gPTP frame relates to a receiving device when the indication of the time domain or the MAC address comprised in the gPTP frame corresponds to the obtained information regarding the time domain to which the receiving device and/or the one or more second end stations connected to the receiving device are related.

The transmitting device X010 may be configured to, e.g. by means of the processing unit 1500 and/or the transmitting unit 1502 being configured to, transmit, the PDU session comprising the gPTP frame using broadcasting.

The transmitting device X010 may be configured to, e.g. by means of the processing unit 1500 and/or the transmitting unit 1502 being configured to, transmit the PDU session comprising the gPTP frame using multicasting or unicasting.

The transmitting device X010 may be configured to, e.g. by means of the processing unit 1500 and/or the stamping unit 1505 being configured to, set a first time stamp on the gPTP frame when the gPTP frame is received and/or transmitted by the transmitting device, wherein the first time stamp may be used to calculate a correction time for compensating for varying delays in the 3GPP wireless communication system 100.

The transmitting device X010 may be configured to, e.g. by means of the processing unit 1500 and/or the obtaining unit 1504 being configured to, obtain the information regarding the time domain to which the receiving device and/or one or more second end stations connected to the receiving device are related to by being configured to, e.g. by means of the processing unit 1500 and/or the receiving unit 1501 being configured to, receive the information from the receiving device.

The transmitting device X010 may be configured to, e.g. by means of the processing unit 1500 and/or the obtaining unit 1504 being configured to, obtain the information regarding the time domain to which the receiving device and/or end stations connected to the receiving device are related to by being configured to, e.g. by means of the processing unit 1500 and/or the receiving unit 1501 being configured to, receive a pre-configuration indicating which receiving devices are related to a specific time domain.

Figure 16:
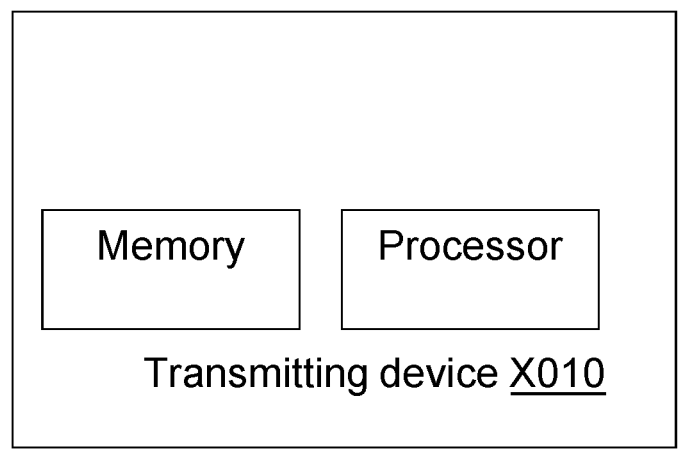
FIG. 16 is a schematic block diagram illustrating some second embodiments of the transmitting device.
Figure 16:
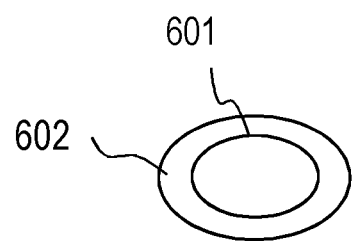

The embodiments herein may be implemented through a respective processor or one or more processors of a processing circuitry in the transmitting device X010 as depicted in FIG. 16, which processing circuitry is configured to perform the method actions according to FIG. 13 and the embodiments described above for the transmitting device X010.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the transmitting device X010. One such carrier may be in the form of a CD ROM disc. It is however feasible with other data carriers such as e.g. a memory stick. The computer program code may furthermore be provided as pure program code on a server and downloaded to the transmitting device X010.

The transmitting device may further comprise a memory 1508. The memory may comprise one or more memory units to be used to store data on, such as e.g. information regarding the retransmissions, PUSCH resource table, software, patches, system information (SI), configurations, diagnostic data, performance data and/or applications to perform the methods disclosed herein when being executed, and similar.

The method according to the embodiments described herein for the transmitting device X010 may be implemented by means of e.g. a computer program product 1509, 1601 or a computer program, comprising instructions, i.e., software code portions, which, when executed on at least one processor, cause at least one processor to carry out the actions described herein, as performed by the transmitting device X010. The computer program product 1509, 1601 may be stored on a computer-readable storage medium 1510, 1602, e.g. a disc or similar. The computer-readable storage medium 1510, 1602, having stored there on the computer program, may comprise instructions which, when executed on at least one processor, cause the at least one processor to carry out the actions described herein, as performed by the transmitting device X010. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the transmitting device X010.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 17:
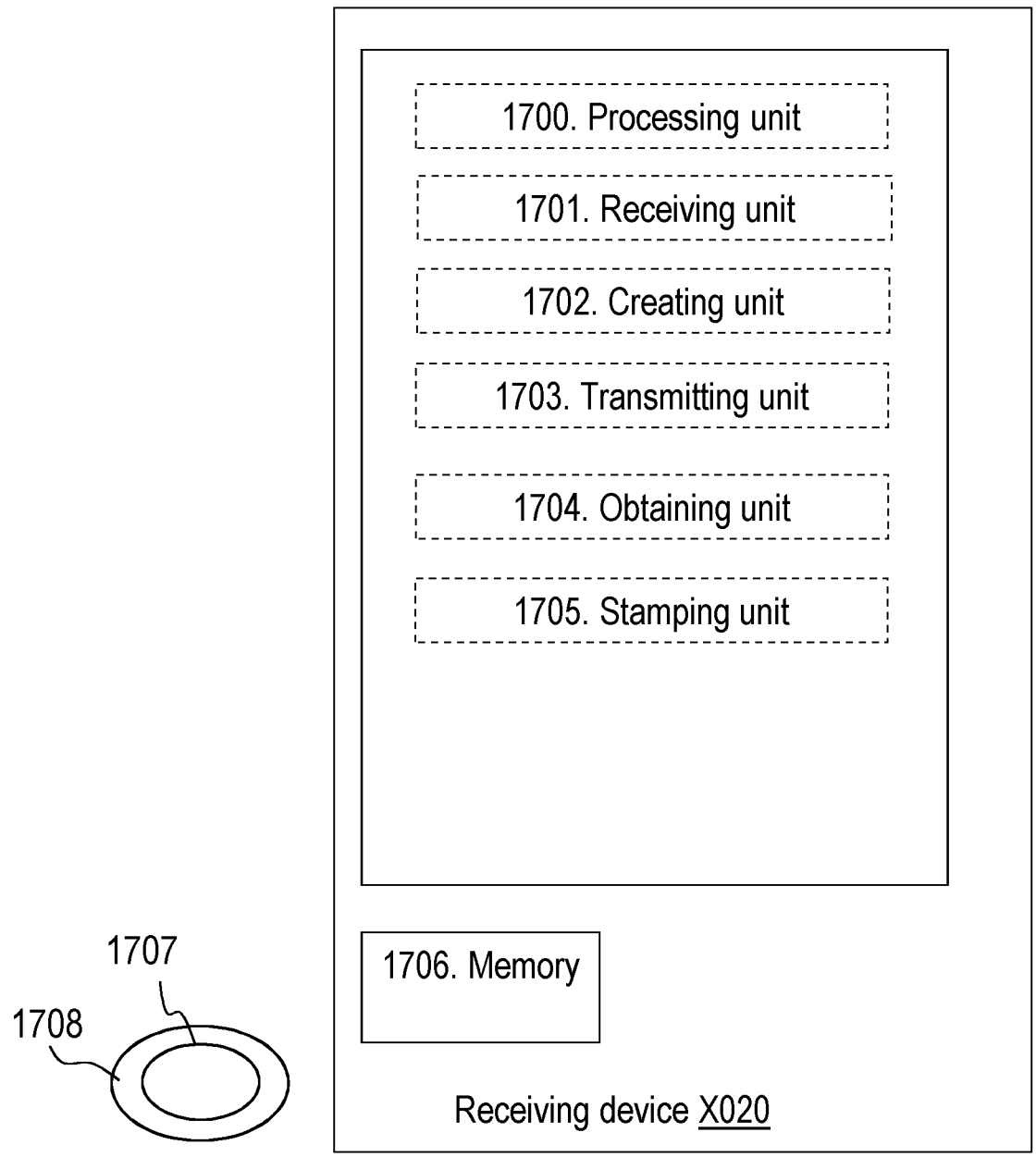
FIG. 17 is a schematic block diagram illustrating some first embodiments of a receiving device.

FIG. 17 is a block diagram depicting the receiving device X020, such as e.g. the UE 120 during DL transmissions or the radio network node 110 or the UPF during UL transmissions, in a wireless communication system 100, such as e.g. a 5G system, for handling gPTP signaling from a TSN.

The receiving device X020 may comprise a processing unit 1500, such as e.g. one or more processors, a receiving unit 1701, a determining unit 1702, a transmitting unit 1703, an obtaining unit 1704, and/or a stamping unit 1705 as exemplifying hardware units configured to perform the method as described herein for the receiving device X020.

The receiving device X020 may be configured to, e.g. by means of the processing unit 1700 and/or the receiving unit 1701 being configured to, receive, from a transmitting device, such as e.g. the UE 120 during UL and/or the network node 110 or the UPF during DL, a PDU session comprising gPTP frame which in turn comprises a time information an indication of a time domain related to the time information and/or a MAC address of one or more second end stations connected to a receiving device.

The receiving device X020 may be configured to, e.g. by means of the processing unit 1700 and/or the determining unit 1702 being configured to, determine, based on the indication of the time domain and/or the MAC address, one or more second end stations in the TSN network to transmit the received gPTP frame to.

The receiving device X020 may be configured to, e.g. by means of the processing unit 1700 and/or the transmitting unit 1703 being configured to, transmit, to the one or more second end stations in the TSN network, the gPTP frame, wherein the gPTP frame comprises the time information and the time domain related to the time information extracted from the 3GPP message.

The receiving device X020 may be configured to, e.g. by means of the processing unit 1700 and/or the obtaining unit 1704 being configured to, obtain, when the PDU session is received as a broadcasted message, information regarding time domain supported by the one or more second end stations in the TSN network, which end stations are connected to the receiving device.

The receiving device X020 may be configured to, e.g. by means of the processing unit 1700 and/or the transmitting unit 1703 being configured to, transmit the broadcasted time information to the one or more second end stations, when the broadcasted PDU session relates to a time domain supported by the one or more second end stations of the TSN.

The receiving device X020 may be configured to, e.g. by means of the processing unit 1700 and/or the obtaining unit 1704 being configured to, obtain the information regarding the time domain supported by the one or more second end stations in the TSN, by being configured to receive a gPTP message, such as e.g. a gPTP Announce message, delivered periodically by the one or more second end stations.

The receiving device X020 may be configured to, e.g. by means of the processing unit 1700 and/or the obtaining unit 1704 being configured to, obtain the information regarding the time domain supported by the one or more second end stations in the TSN, by being configured to receive information from a TSN network controller, wherein the information comprises a receiving device identifier, such as e.g. a UE identifier, or a MAC address of the one or more second end stations.

The receiving device X020 may be configured to, e.g. by means of the processing unit 1700 and/or the stamping unit 1704 being configured to, set a second time stamp on the gPTP frame when the PDU session comprising the gPTP frame is received and/or the gPTP frame is transmitted by the receiving device. The second time stamp may be used in combination with the first time stamp received on the gPTP frame, to calculate a correction time for compensating for varying delays in the 3GPP wireless communication system 100.

Figure 18:
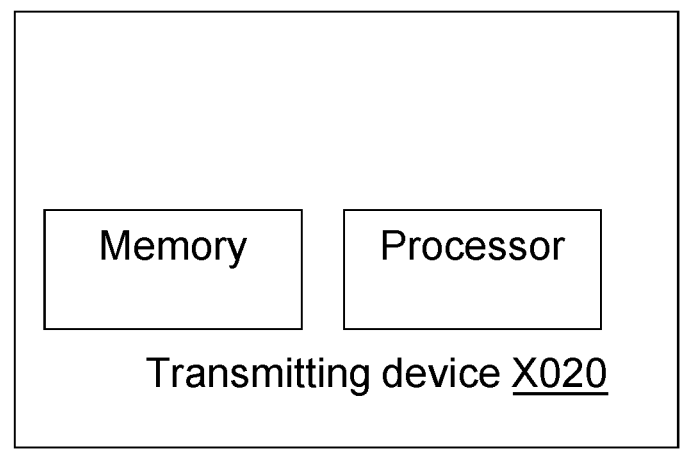
FIG. 18 is a schematic block diagram illustrating some second embodiments of the receiving device.
Figure 18:
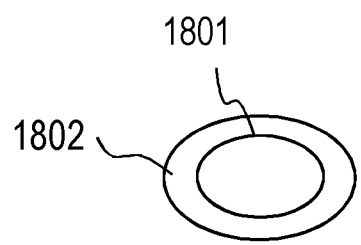

The embodiments herein may be implemented through a respective processor or one or more processors of a processing circuitry in the receiving device X020 as depicted in FIG. 18, which processing circuitry is configured to perform the method actions according to FIG. 14 and the embodiments described above for the receiving device X020.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the receiving device X020. One such carrier may be in the form of a CD ROM disc. It is however feasible with other data carriers such as e.g. a memory stick. The computer program code may furthermore be provided as pure program code on a server and downloaded to the receiving device X020.

The receiving device may further comprise a memory 1706. The memory may comprise one or more memory units to be used to store data on, such as e.g. information regarding the retransmissions, PUSCH resource table, software, patches, system information (SI), configurations, diagnostic data, performance data and/or applications to perform the methods disclosed herein when being executed, and similar.

The method according to the embodiments described herein for the receiving device X020 may be implemented by means of e.g. a computer program product 1707, 1801 or a computer program, comprising instructions, i.e., software code portions, which, when executed on at least one processor, cause at least one processor to carry out the actions described herein, as performed by the receiving device X020. The computer program product 1707, 1801 may be stored on a computer-readable storage medium 1708, 1802, e.g. a disc or similar. The computer-readable storage medium 1708, 1802, having stored thereon the computer program, may comprise instructions which, when executed on at least one processor, cause the at least one processor to carry out the actions described herein, as performed by the receiving device X020. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the receiving device X020.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

It shall be noted that the nodes mentioned herein may be arranged as separate nodes or may be collocated within one or more nodes in the communications network. When a plurality of nodes are collocated in one node, the single node may be configured to perform the actions of each of the collocated nodes.

Further Extensions and Variations

Figure 19:
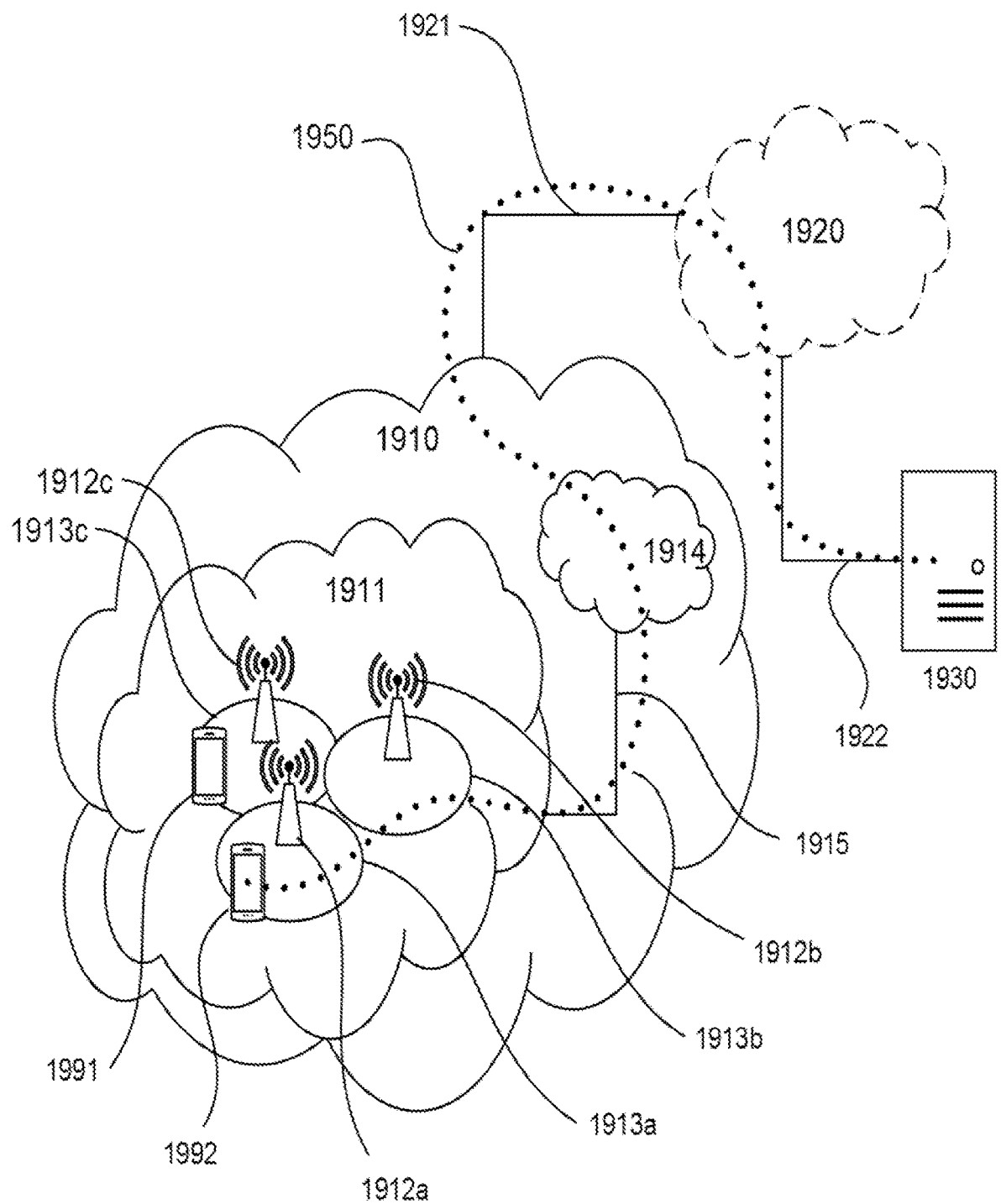
FIG. 19 is a schematic overview of a host computer communicating via a base station with a user equipment over a partially wireless connection in accordance with some embodiments.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, e.g. the radio network node 110, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991, such as the UE 120, located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink (UL) and downlink (DL) communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

Figure 20:
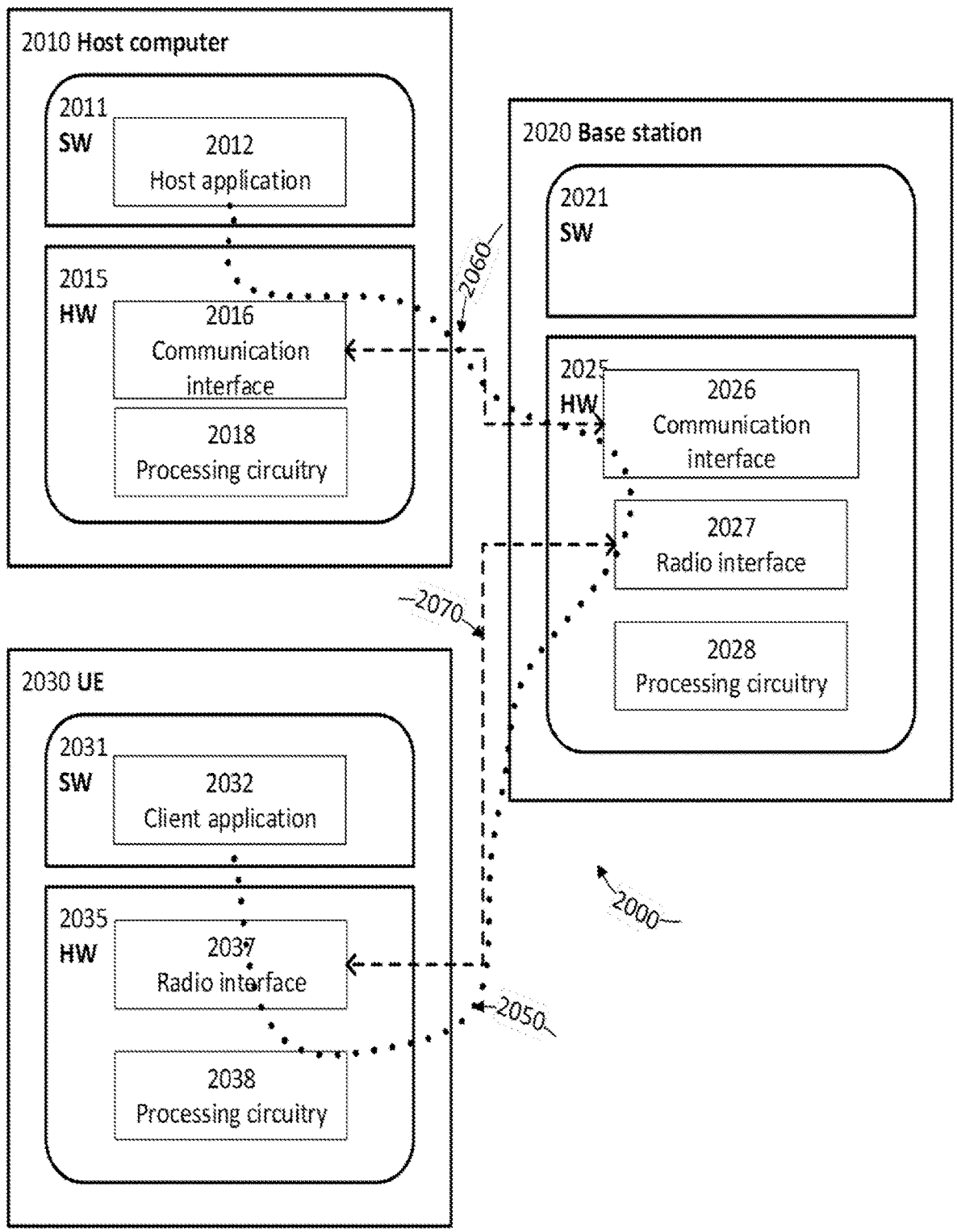
FIG. 20 is a flowchart depicting methods implemented in a communication system including a host computer, a base station and a user equipment in accordance with some embodiments.

It is noted that host computer 2010, base station 2020 and UE 2030 illustrated in FIG. 20 may be similar or identical to host computer 1930, one of base stations 1912a, 1912b, 1912c and one of UEs 1991, 1992 of FIG. 19, respectively.

This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve end-to-end time synchronization with multiple time-domains and thereby provide benefits such as improved performance and efficiency of the communications network, in particular when forward time signals from multiple time domains.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figures 21, 22:
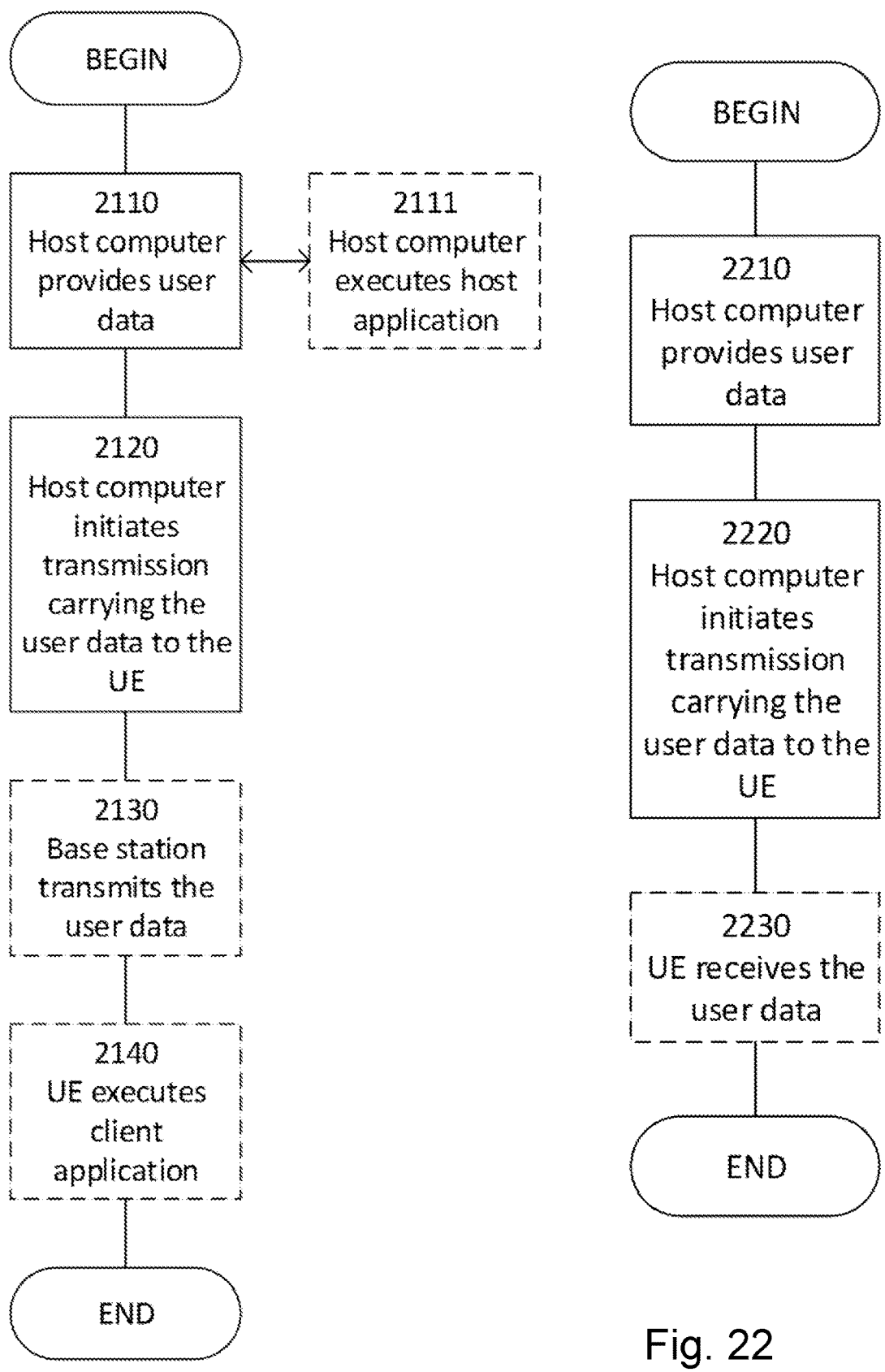
FIG. 22 is a flowchart depicting methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 19 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 20 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Below, some example embodiments 1-26 are described.

Embodiment 1. A method, performed by a transmitting device, such as e.g. a UE (120), a radio network node (110) and/or a User Plane Function (UPF), in a 3GPP wireless communication system (100), such as e.g. a 5G system, for handling generalized Precise Timing Protocol, gPTP, signaling, from a Time Sensitive Network, TSN, the method comprising:
  receiving (1301), from the TSN network, a gPTP frame, such as e.g. an Announce message or a sync message, wherein the gPTP frame comprises time information, an indication of a time domain related to the time information and/or a MAC address of a second end station connected to a receiving device,
  determining (1302), based on the indication of the time domain and/or the MAC address, the receiving device which the gPTP frame relates to,
  transmitting (1304), to the determined receiving device, such as e.g. the radio network node (110), the UPF in Uplink, UL, and/or the UE (120) in downlink, DL, the gPTP frame in a PDU session related to the determined receiving device.

Embodiment 2. The method according to Embodiment 1, wherein the step of determining which receiving device the gPTP frame relates to comprises:
  obtaining (1302a) information regarding the time domain to which the receiving device and/or one or more second end stations connected to the receiving device are related,
  and wherein the step of determining (1302) comprises determining (1302b) that the received gPTP frame relates to a receiving device when the indication of the time domain or the MAC address comprised in the gPTP frame corresponds to the obtained information regarding the time domain to which the receiving device and/or the one or more second end stations connected to the receiving device are related.

Embodiment 3. The method according to Embodiment 1, wherein the transmitting device is a radio network node or a UPF, and the gPTP frame is transmitted using broadcasting.

Embodiment 4. The method according to Embodiment 2, wherein the gPTP frame is transmitted using multicasting or unicasting.

Embodiment 5. The method according to any of the previous Embodiments, wherein the method further comprises:
  setting (1303) a first time stamp on the gPTP frame when the gPTP frame is received and/or transmitted by the transmitting device, wherein the first time stamp may be used to calculate a correction time for compensating for varying delays in the 3GPP wireless communication system (100).

Embodiment 6. The method according to any of the Embodiments 2, 4 and 5 wherein the step of obtaining information regarding the time domain to which the receiving device and/or one or more second end stations connected to the receiving device are related to comprises receiving the information from the receiving device.

Embodiment 7. The method according to any of the Embodiments 2, 4 and 5, wherein the step of obtaining information regarding the time domain to which the receiving device and/or end stations connected to the receiving device are related to comprises receiving a pre-configuration indicating which receiving devices are related to a specific time domain.

Embodiment 7a. The method according to any of the Embodiments 2, 4 and 5, wherein the information regarding the time domain supported by the one or more second end stations in the TSN, is obtained by receiving information from a TSN network controller, wherein the information comprises a receiving device identifier, such as e.g. a UE identifier, or a MAC address of the one or more second end stations.

Embodiment 8. A method, performed by a receiving device such as e.g. a UE (120), a radio network node (110) and/or a User Plane Function (UPF), in a 3GPP wireless communication system (100), such as e.g. a 5G system, for handling generalized Precise Timing Protocol, gPTP, signaling, from a Time Sensitive Network, TSN, the method comprising:
  receiving (1401), from a transmitting device, such as e.g. the radio network node (110), the UPF and/or the UE (120), a PDU session comprising gPTP frame which in turn comprises a time information an indication of a time domain related to the time information and/or a MAC address of one or more second end stations connected to a receiving device,
  determining (1402), based on the indication of the time domain and/or the MAC address, one or more second end stations in the TSN network to transmit the received gPTP frame to,
  transmitting (1405), to the one or more second end stations in the TSN network, the gPTP frame, wherein the gPTP frame comprises the time information and the time domain related to the time information extracted from the 3GPP message.

Embodiment 9. The method according to Embodiment 8, wherein when the PDU session is received as a broadcasted message, the method further comprises:
  obtaining (1403) information regarding time domain supported by the one or more second end stations in the TSN network, which end stations are connected to the receiving device, and
  transmitting (1405a), to the one or more second end stations, the broadcasted time information, when the broadcasted PDU session relates to a time domain supported by the one or more second end stations of the TSN.

Embodiment 10. The method according to embodiment 8 or 9, wherein the information regarding the time domain supported by the one or more second end stations in the TSN, is obtained by receiving a gPTP message, such as e.g. a gPTP Announce message, delivered periodically by the one or more second end stations.

Embodiment 11. The method according to embodiment 8 or 9, wherein the information regarding the time domain supported by the one or more second end stations in the TSN, is obtained by receiving information from a TSN network controller, wherein the information comprises a receiving device identifier, such as e.g. a UE identifier, or a MAC address of the one or more second end stations.

Embodiment 12. The method according to any of the Embodiments 8 to 11, wherein the method further comprises:
    setting (1404) a second time stamp on the gPTP frame when the PDU session comprising the gPTP frame is received and/or the gPTP frame is transmitted by the receiving device, wherein the second time stamp may be used in combination with the first time stamp received on the gPTP frame, to calculate a correction time for compensating for varying delays in the 3GPP wireless communication system (100).

Embodiment 13. A transmitting device, such as e.g. a UE (120), a radio network node (110) and/or a User Plane Function (UPF), in a 3GPP wireless communication system (100), such as e.g. a 5G system, for handling generalized Precise Timing Protocol, gPTP, signaling, from a Time Sensitive Network, TSN, the transmitting device being configured to:
    receive, from the TSN network, a gPTP frame, such as e.g. an Announce message or a sync message, wherein the gPTP frame comprises time information, an indication of a time domain related to the time information and/or a MAC address of a second end station connected to a receiving device,
    determine, based on the indication of the time domain and/or the MAC address, the receiving device which the gPTP frame relates to,
    transmit, to the determined receiving device, such as e.g. the radio network node (110), the UPF in Uplink, UL, and/or the UE (120) in downlink, DL, the gPTP frame in a PDU session related to the determined receiving device.

Embodiment 14. The transmitting device according to Embodiment 13, wherein the transmitting device is configured to determine the receiving device which the gPTP frame relates to by being configured to:
    obtain information regarding the time domain to which the receiving device and/or one or more second end stations connected to the receiving device are related, and
    determine that the received gPTP frame relates to a receiving device when the indication of the time domain or the MAC address comprised in the gPTP frame corresponds to the obtained information regarding the time domain to which the receiving device and/or the one or more second end stations connected to the receiving device are related.

Embodiment 15. The transmitting device according to Embodiment 13, wherein the transmitting device is a radio network node or a UPF, and the PDU session is transmitted using broadcasting, and wherein the transmitting device is further configured to transmit the gPTP frame using broadcasting.

Embodiment 16. The transmitting device according to Embodiment 13 or 14, wherein the transmitting device is configured to transmit the gPTP frame using multicasting or unicasting.

Embodiment 17. The transmitting device according to any of the previous Embodiments 10 to 15, wherein the receiving device is configured to set a first time stamp on the gPTP frame when the gPTP frame is received and/or transmitted by the transmitting device, wherein the first time stamp may be used to calculate a correction time for compensating for varying delays in the 3GPP wireless communication system (100).

Embodiment 18 The transmitting device according to any of the Embodiments 13 to 16 and 17 when depending on any of Embodiments 13 to 16, wherein the transmitting device is further configured to obtain the information regarding the time domain to which the receiving device and/or one or more second end stations connected to the receiving device are related to by being configured to receive the information from the receiving device.

Embodiment 19. The transmitting device according to any of the Embodiments 13 to 16 and 17 when depending on any of Embodiments 13 to 16, wherein the transmitting device is further configured to obtain the information regarding the time domain to which the receiving device and/or end stations connected to the receiving device are related to by being configured to receive a pre-configuration indicating which receiving devices are related to a specific time domain.

Embodiment 19a. The transmitting device according to any of the Embodiments 13 to 16 and 17 when depending on any of Embodiments 13 to 16, wherein the transmitting device is configured to obtain the information regarding the time domain supported by the one or more second end stations in the TSN, by being configured to receive information from a TSN network controller, wherein the information comprises a receiving device identifier, such as e.g. a UE identifier, or a MAC address of the one or more second end stations.

Embodiment 20. A receiving device, such as e.g. a UE (120), a radio network node (110) and/or a User Plane Function (UPF), in a wireless communication system (100), such as e.g. a 5G system, for handling generalized Precise Timing Protocol, gPTP, signaling, from a Time Sensitive Network, TSN, the receiving device being configured to:
    receive, from a transmitting device, such as e.g. the radio network node (110), the UPF and/or the UE (120), a PDU session comprising gPTP frame which in turn comprises a time information an indication of a time domain related to the time information and/or a MAC address of one or more second end stations connected to a receiving device,
    determine, based on the indication of the time domain and/or the MAC address, one or more second end stations in the TSN network to transmit the received gPTP frame to,
    transmit, to the one or more second end stations in the TSN network, the gPTP frame, wherein the gPTP frame comprises the time information and the time domain related to the time information extracted from the 3GPP message.

Embodiment 21. The receiving device according to Embodiment 20, wherein, when the PDU session is received as a broadcasted message, the receiving device further being configured to:
    obtain information regarding time domain supported by the one or more second end stations in the TSN network, which end stations are connected to the receiving device, and
    transmit, to the one or more second end stations, the broadcasted time information, when the broadcasted PDU session relates to a time domain supported by the one or more second end stations of the TSN.

Embodiment 22. The receiving device according to embodiment 20 or 21, wherein the receiving device is configured to obtain the information regarding the time domain supported by the one or more second end stations in the TSN, by being configured to receive a gPTP message, such as e.g. a gPTP Announce message, delivered periodically by the one or more second end stations.

Embodiment 23. The receiving device according to embodiment 20 or 21, wherein the receiving device is configured to obtain the information regarding the time domain supported by the one or more second end stations in the TSN, by being configured to receive information from a TSN network controller, wherein the information comprises a receiving device identifier, such as e.g. a UE identifier, or a MAC address of the one or more second end stations.

Embodiment 24. The receiving device according to any of the Embodiments 20 to 23, wherein the receiving device is further configured to set a second time stamp on the gPTP frame when the PDU session comprising the gPTP frame is received and/or the gPTP frame is transmitted by the receiving device, wherein the second time stamp may be used in combination with the first time stamp received on the gPTP frame, to calculate a correction time for compensating for varying delays in the 3GPP wireless communication system (100).

Embodiment 25. A computer program comprising instructions, which when executed by a processor, causes the processor to perform actions according to any of the Embodiments 1-12.

Embodiment 26. A carrier comprising the computer program of Embodiment 25, wherein the carrier is one of an electronic signal, an optical signal, an electromagnetic signal, a magnetic signal, an electric signal, a radio signal, a microwave signal, or a computer-readable storage medium.

The invention claimed is:

1. A method, performed by a transmitting device, in a 3GPP wireless communication system, for handling generalized Precise Timing Protocol (gPTP) signaling, from a Time Sensitive Network (TSN), the method comprising:
    receiving, by the transmitting device in the 3GPP wireless communication system, from the TSN network, a gPTP frame that comprises time information, wherein the gPTP frame further comprises an indication of a time domain related to the time information and/or a Medium Access Control (MAC) address of a second end station in the TSN network, the second end station being connected to a receiving device in the 3GPP wireless communication system, the indication of the time domain including a domain number identifying one of a plurality of time domains, each time domain having an independent clock;
    determining, by the transmitting device, based on the indication of the time domain and/or the MAC address, the receiving device to which the gPTP frame relates, wherein determining to which receiving device the gPTP frame relates comprises:
        obtaining information regarding the time domain to which the receiving device and/or one or more second end stations connected to the receiving device are related, by at least one of, a) receiving the information from the receiving device, b) receiving a pre-configuration indicating which receiving devices are related to a specific time domain, and c) receiving from a TSN network controller information that comprises a receiving device identifier or a MAC address of the one or more second end stations; and
        determining that the received gPTP frame relates to the receiving device when the indication of the time domain or the MAC address comprised in the gPTP frame corresponds to the obtained information regarding the time domain to which the receiving device and/or the one or more second end stations connected to the receiving device are related; and
    transmitting, by the transmitting device, to the determined receiving device, the gPTP frame in a Protocol Data Unit (PDU) session related to the determined receiving device.

2. The method according to claim 1, wherein the method further comprises setting a first time stamp on the gPTP frame when the gPTP frame is received and/or transmitted by the transmitting device, wherein the first time stamp is usable to calculate a correction time for compensating for varying delays in the 3GPP wireless communication system.

3. The method according to claim 1, wherein the receiving device identifier comprises a user equipment (UE) identifier.

4. A non-transitory computer-readable storage medium on which is stored a computer program that, when executed by a transmitting device in a 3GPP wireless communication system, causes the transmitting device to handle generalized Precise Timing Protocol (gPTP) signaling from a Time Sensitive Network (TSN), the computer program causing the transmitting device to:
    receive, from the TSN network, a gPTP frame that comprises time information, wherein the gPTP frame further comprises an indication of a time domain related to the time information and/or a Medium Access Control (MAC) address of a second end station in the TSN network, the second end station being connected to a receiving device in the 3GPP wireless communication system, the indication of the time domain including a domain number identifying one of a plurality of time domains, each time domain having an independent clock;
    determine, based on the indication of the time domain and/or the MAC address, the receiving device to which the gPTP frame relates, wherein the computer program causes the transmitting device to determine to which receiving device the gPTP frame relates by:
        obtaining information regarding the time domain to which the receiving device and/or one or more second end stations connected to the receiving device are related, by at least one of, a) receiving the information from the receiving device, b) receiving a pre-configuration indicating which receiving devices are related to a specific time domain, and c) receiving from a TSN network controller information that comprises a receiving device identifier; and
        determining that the received gPTP frame relates to the receiving device when the indication of the time domain or the MAC address comprised in the gPTP frame corresponds to the obtained information regarding the time domain to which the receiving device and/or the one or more second end stations connected to the receiving device are related; and
    transmit, to the determined receiving device, the gPTP frame in a Protocol Data Unit (PDU) session related to the determined receiving device.

5. A method, performed by a receiving device, in a 3GPP wireless communication system, for handling generalized Precise Timing Protocol (gPTP) signaling, from a Time Sensitive Network (TSN), the method comprising:
    receiving, by the receiving device in the 3GPP wireless communication system, from a transmitting device in the 3GPP wireless communication system, a Protocol Data Unit (PDU) session comprising a gPTP frame that comprises time information, wherein the gPTP frame further comprises an indication of a time domain related to the time information and/or a Medium Access Control (MAC) address, the indication of the time domain including a domain number identifying one of a plurality of time domains, each time domain having an independent clock;

determining, by the receiving device, based on the indication of the time domain and/or the MAC address, one or more second end stations in the TSN network to which to transmit the received gPTP frame; and transmitting, by the receiving device, to the one or more second end stations in the TSN network, the gPTP frame, wherein the gPTP frame comprises the time information and the time domain related to the time information extracted from the 3GPP message, wherein the information regarding the time domain supported by the one or more second end stations in the TSN, is obtained by at least one of:
  a) receiving a gPTP message delivered periodically by the one or more second end stations;
  b) receiving information from a TSN network controller, wherein the information comprises a receiving device identifier or a MAC address of the one or more second end stations; and
  c) detecting an interest of one or more second end stations in a time domain by forwarding a gPTP frame of the time domain to the one or more second end stations, and monitoring a potential reply to the gPTP transmission from the one or more second end stations.

6. The method according to claim 5, wherein when the PDU session is received as a broadcasted message, and wherein the method further comprises transmitting, to the one or more second end stations, the broadcasted time information, when the broadcasted PDU session relates to a time domain supported by the one or more second end stations of the TSN.

7. The method according to claim 5, wherein the information regarding the time domain supported by the one or more second end stations in the TSN is received from the one or more second end stations either by:

receiving a gPTP message delivered periodically by the one or more second end stations; or detecting an interest of one or more second end stations in a time domain by forwarding a gPTP frame of the time domain to the one or more second end stations, and monitoring a potential reply to the gPTP transmission from the one or more second end stations;

wherein the information regarding the time domain supported by the one or more second end stations in the TSN is forwarded to the transmitting device.

8. The method according to claim 5, wherein the method further comprises:

setting a second time stamp on the gPTP frame when the PDU session comprising the gPTP frame is received and/or the gPTP frame is transmitted by the receiving device, wherein the second time stamp is usable in combination with the first time stamp received on the gPTP frame to calculate a correction time for compensating for varying delays in the 3GPP wireless communication system.

9. The method according to claim 5, wherein the received gPTP message is a gPTP Announce message.

10. The method according to claim 5, wherein the receiving device identifier is a UE identifier.

11. A non-transitory computer-readable storage medium on which is stored a computer program that, when executed by a receiving device in a 3GPP wireless communication system, causes the receiving device to handle generalized Precise Timing Protocol (gPTP) signaling from a Time Sensitive Network (TSN), the computer program causing the receiving device to:

receive, from a transmitting device in the 3GPP wireless communication system, a Protocol Data Unit (PDU) session comprising a gPTP frame that comprises time information, wherein the gPTP frame further comprises an indication of a time domain related to the time information and/or a Medium Access Control (MAC) address, the indication of the time domain including a domain number identifying one of a plurality of time domains, each time domain having an independent clock;

determine, based on the indication of the time domain and/or the MAC address, one or more second end stations in the TSN network to which to transmit the received gPTP frame; and transmit, to the one or more second end stations in the TSN network, the gPTP frame, wherein the gPTP frame comprises the time information and the time domain related to the time information extracted from the 3GPP message, wherein the information regarding the time domain supported by the one or more second end stations in the TSN, is obtained by at least one of:
  a) receiving a gPTP message delivered periodically by the one or more second end stations;
  b) receiving information from a TSN network controller, wherein the information comprises a receiving device identifier or a MAC address of the one or more second end stations; and
  c) detecting an interest of one or more second end stations in a time domain by forwarding a gPTP frame of the time domain to the one or more second end stations, and monitoring a potential reply to the gPTP transmission from the one or more second end stations.

12. A transmitting device, configured for use in a 3GPP wireless communication system, for handling generalized Precise Timing Protocol (gPTP) signaling, from a Time Sensitive Network (TSN), the transmitting device comprising processing circuitry configured to:

receive, from the TSN network, a gPTP frame that comprises time information, wherein the gPTP frame further comprises an indication of a time domain related to the time information and/or a Medium Access Control (MAC) address of a second end station in the TSN network, the second end station being connected to a receiving device in the 3GPP wireless communication system, the indication of the time domain including a domain number identifying one of a plurality of time domains, each time domain having an independent clock;

determine, based on the indication of the time domain and/or the MAC address, the receiving device to which the gPTP frame relates; and transmit, to the determined receiving device, the gPTP frame in a Protocol Data Unit (PDU) session related to the determined receiving device;

wherein the information regarding the time domain supported by the one or more second end stations in the TSN is obtained by:
  a) receiving a gPTP message delivered periodically by the one or more second end stations;

b) receiving from a TSN network controller information that comprises a receiving device identifier or a MAC address of the one or more second end stations; and c) detection of an interest of one or more second end stations in a time domain by forwarding a gPTP frame of the time domain to the one or more second end stations, and monitoring for a potential reply to the gPTP transmission from the one or more second end stations.

13. The transmitting device according to claim 12, wherein the processing circuitry is configured to determine the receiving device to which the gPTP frame relates by determining that the received gPTP frame relates to the receiving device when the indication of the time domain or the MAC address comprised in the gPTP frame corresponds to the obtained information regarding the time domain to which the receiving device and/or the one or more second end stations connected to the receiving device are related.

14. The transmitting device according to claim 12, wherein the receiving device is configured to set a first time stamp on the gPTP frame when the gPTP frame is received and/or transmitted by the transmitting device, wherein the first time stamp is usable to calculate a correction time for compensating for varying delays in the 3GPP wireless communication system.

15. The transmitting device according to claim 12, wherein the gPTP frame is an Announce message or a sync message, and/or wherein the gPTP message is a gPTP Announce message, and/or wherein the receiving device identifier is a UE identifier.

16. A receiving device configured for use in a 3GPP wireless communication system, for handling generalized Precise Timing Protocol (gPTP) signaling, from a Time Sensitive Network (TSN), the receiving device comprising processing circuitry configured to:

receive, from a transmitting device in the 3GPP wireless communication system, a Protocol Data Unit (PDU) session comprising a gPTP frame that comprises time information, wherein the gPTP frame further comprises an indication of a time domain related to the time information and/or a Medium Access Control (MAC) address, the indication of the time domain including a domain number identifying one of a plurality of time domains, each time domain having an independent clock;

determine, based on the indication of the time domain and/or the MAC address, one or more second end stations in the TSN network to which to transmit the received gPTP frame; and transmit, to the one or more second end stations in the TSN network, the gPTP frame, wherein the gPTP frame comprises the time information and the time domain related to the time information extracted from the 3GPP message, wherein the information regarding the time domain supported by the one or more second end stations in the TSN is obtained by at least one of:

a) receiving a gPTP message delivered periodically by the one or more second end stations, b) receiving information from a TSN network controller, wherein the information comprises a receiving device identifier or a MAC address of the one or more second end stations, and c) detecting an interest of one or more second end stations in a time domain by forwarding a gPTP frame of the time domain to the one or more second end stations, and monitoring a potential reply to the gPTP transmission from the one or more second end stations.

17. The receiving device according to claim 16, wherein the processing circuitry is configured to, when the PDU session is received as a broadcasted message, transmit, to the one or more second end stations, the broadcasted time information, when the broadcasted PDU session relates to a time domain supported by the one or more second end stations of the TSN.

18. The receiving device according to claim 16, wherein the processing circuitry is further configured to set a second time stamp on the gPTP frame when the PDU session comprising the gPTP frame is received and/or the gPTP frame is transmitted by the receiving device, wherein the second time stamp is usable in combination with the first time stamp received on the gPTP frame, to calculate a correction time for compensating for varying delays in the 3GPP wireless communication system.

19. The receiving device according to claim 16, wherein the gPTP message is a gPTP Announce message and/or wherein the receiving device identifier is a UE identifier.

* * * * *